United States Patent
Shiokawa et al.

(10) Patent No.: US 12,548,878 B2
(45) Date of Patent: Feb. 10, 2026

(54) ELECTRONIC CIRCUIT, OSCILLATOR, AND CALCULATING DEVICE

(71) Applicant: KABUSHIKI KAISHA TOSHIBA, Tokyo (JP)

(72) Inventors: Noritsugu Shiokawa, Yokohama Kanagawa (JP); Hayato Goto, Kawasaki Kanagawa (JP); Taro Kanao, Kumagaya Saitama (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 1026 days.

(21) Appl. No.: 17/676,884

(22) Filed: Feb. 22, 2022

(65) Prior Publication Data

US 2023/0059903 A1 Feb. 23, 2023

(30) Foreign Application Priority Data

Aug. 23, 2021 (JP) .................. 2021-135586

(51) Int. Cl.
*H01L 29/06* (2006.01)
*H01L 29/08* (2006.01)
*H01L 31/0256* (2006.01)
*H01P 7/04* (2006.01)

(52) U.S. Cl.
CPC ..................... *H01P 7/04* (2013.01)

(58) Field of Classification Search
CPC ......................................... H01P 7/04
See application file for complete search history.

(56) References Cited

U.S. PATENT DOCUMENTS

| 10,235,635 | B1 | 3/2019 | Abdo | |
| 11,574,230 | B1* | 2/2023 | Rigetti | .............. H01L 21/76891 |
| 12,204,002 | B2* | 1/2025 | Swenson | ............ G01R 33/0354 |
| 2016/0328659 | A1* | 11/2016 | Mohseni | ................ G06N 20/00 |

(Continued)

FOREIGN PATENT DOCUMENTS

| CN | 203456567 U | * | 2/2014 |
| CN | 207503912 U | * | 6/2018 |

(Continued)

OTHER PUBLICATIONS

Japan Patent Office, Office Action in JP App. No. 2021-135586, 3 pages, and machine translation, 3 pages (May 28, 2024).

*Primary Examiner* — Ismail A Muse
(74) *Attorney, Agent, or Firm* — Finnegan, Henderson, Farabow, Garrett & Dunner, LLP

(57) ABSTRACT

According to one embodiment, an electronic circuit includes an element part. The element part includes a first resonator and a second resonator. The first resonator includes a first conductive layer, a second conductive layer, a first current path including a first Josephson junction, and a second current path including a second Josephson junction. The first current path includes a first end portion and a second end portion. The first end portion is connected with the first conductive layer. The second end portion is connected with the second conductive layer. The second current path includes a third end portion and a fourth end portion. The third end portion is connected with the first conductive layer. The fourth end portion is connected with the second conductive layer. The second resonator is configured to be electromagnetically coupled with the first resonator.

19 Claims, 18 Drawing Sheets

(56) References Cited

U.S. PATENT DOCUMENTS

| | | | |
|---|---|---|---|
| 2018/0240033 A1 | 8/2018 | Leek | |
| 2020/0091867 A1* | 3/2020 | Goto | H03B 15/003 |
| 2020/0320426 A1* | 10/2020 | Amin | G06N 10/40 |
| 2021/0257969 A1* | 8/2021 | Bardin | G06N 10/00 |
| 2024/0030913 A1* | 1/2024 | Heinsoo | H10N 69/00 |

FOREIGN PATENT DOCUMENTS

| | | |
|---|---|---|
| JP | 6779278 B2 | 11/2020 |
| JP | 2021-500737 A | 1/2021 |

\* cited by examiner

ELECTRONIC CIRCUIT, OSCILLATOR, AND CALCULATING DEVICE

CROSS-REFERENCE TO RELATED APPLICATIONS

This application is based upon and claims the benefit of priority from Japanese Patent Application No. 2021-135586, filed on Aug. 23, 2021; the entire contents of which are incorporated herein by reference.

FIELD

Embodiments described herein relate generally to an electronic circuit, an oscillator, and a calculating device.

BACKGROUND

For example, an electronic circuit that includes a Josephson junction is applied to a calculating device. It is desirable to downsize the electronic circuit.

DETAILED DESCRIPTION

Figure 1:
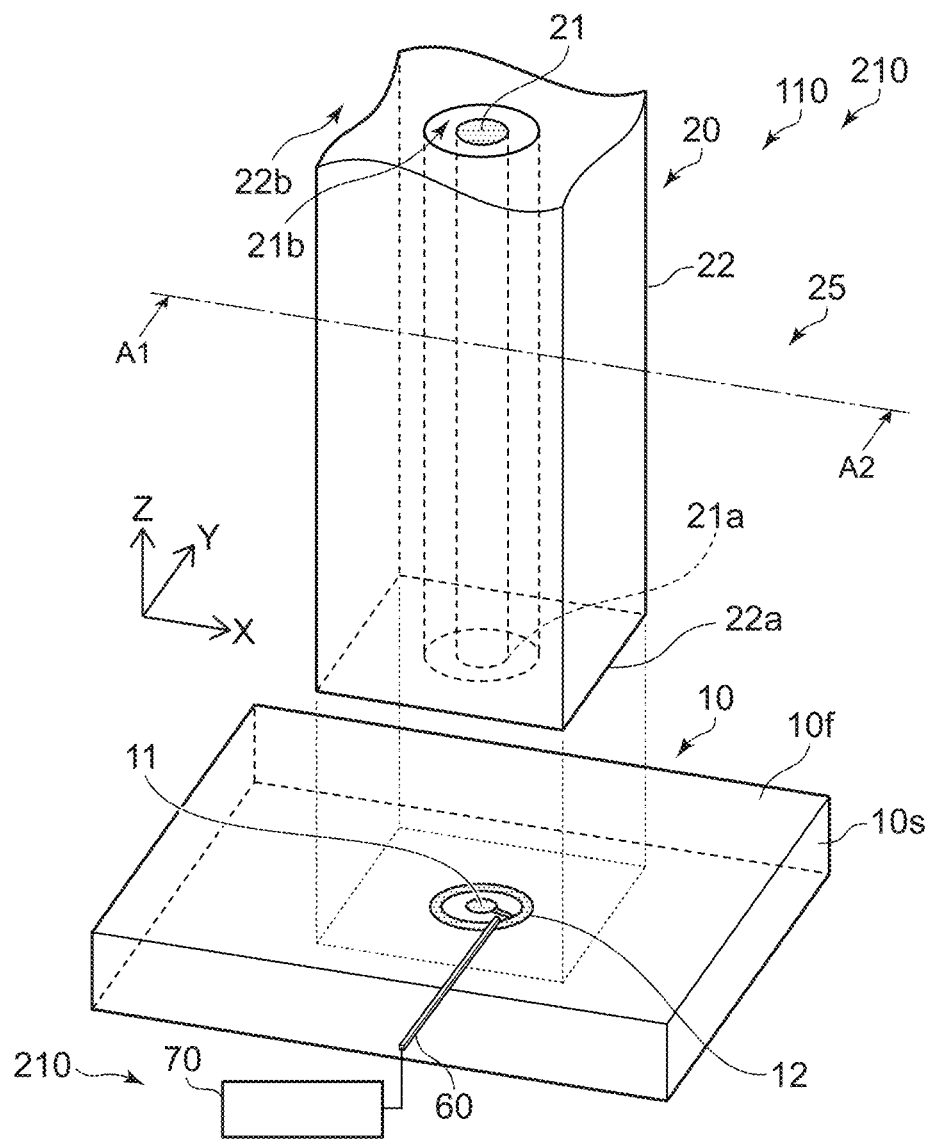
FIG. 1 is a schematic perspective view illustrating an electronic circuit according to a first embodiment.

According to one embodiment, an electronic circuit includes an element part. The element part includes a first resonator and a second resonator. The first resonator includes a first conductive layer, a second conductive layer, a first current path including a first Josephson junction, and a second current path including a second Josephson junction. The first current path includes a first end portion and a second end portion. The first end portion is connected with the first conductive layer. The second end portion is connected with the second conductive layer. The second current path includes a third end portion and a fourth end portion. The third end portion is connected with the first conductive layer. The fourth end portion is connected with the second conductive layer. The second resonator is configured to be electromagnetically coupled with the first resonator.

According to one embodiment, an oscillator includes the electronic circuit described above, and a controller. The electronic circuit further includes a first conductive member. The controller is configured to supply an electrical signal to the first conductive member. The first current path and the second current path are around a space. A magnetic field is generated from the first conductive member according to the electrical signal supplied to the first conductive member. The magnetic field passes through the space.

According to one embodiment, a calculating device includes the oscillator described above, and a coupler. The oscillator includes a plurality of the electronic circuits. The coupler couples one of the electronic circuits and an other one of the electronic circuits.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic perspective view illustrating an electronic circuit according to a first embodiment.

Figure 2A:
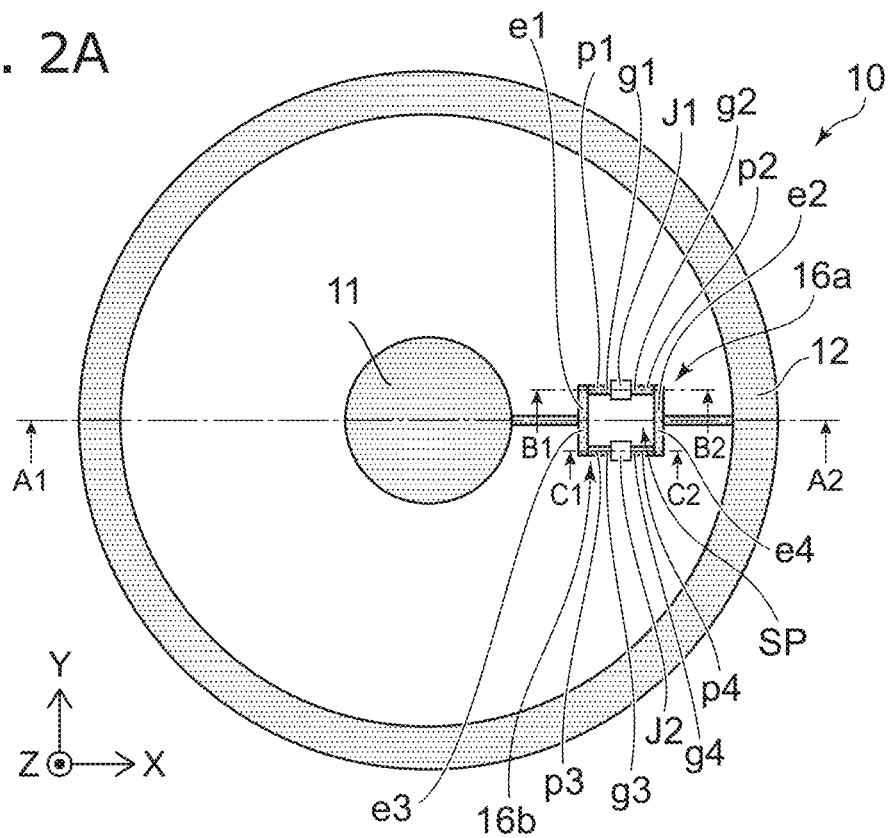
FIGS. 2A to 2C are schematic views illustrating the electronic circuit according to the first embodiment.
Figure 2B:
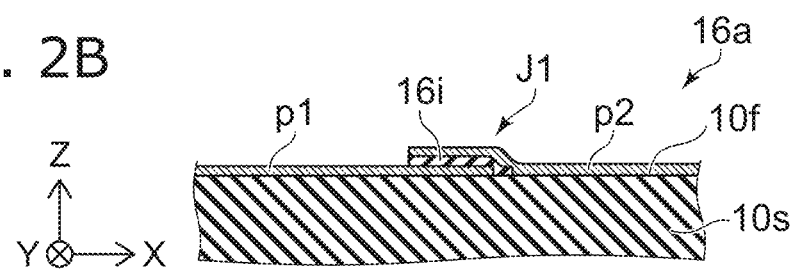
Figure 2C:
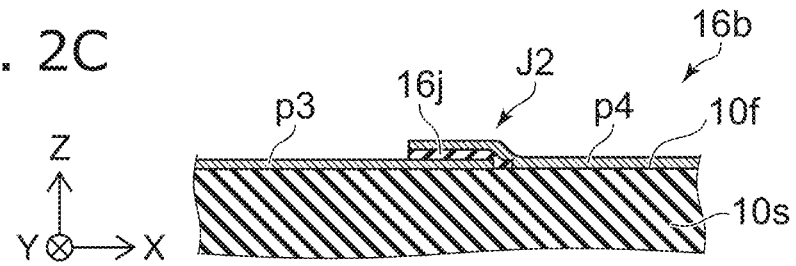

FIGS. 2A to 2C are schematic views illustrating the electronic circuit according to the first embodiment.

FIG. 2A is a plan view illustrating a portion of the electronic circuit. FIG. 2B is a line B1-B2 cross-sectional view of FIG. 2A. FIG. 2C is a line C1-C2 cross-sectional view of FIG. 2A.

Figure 3A:
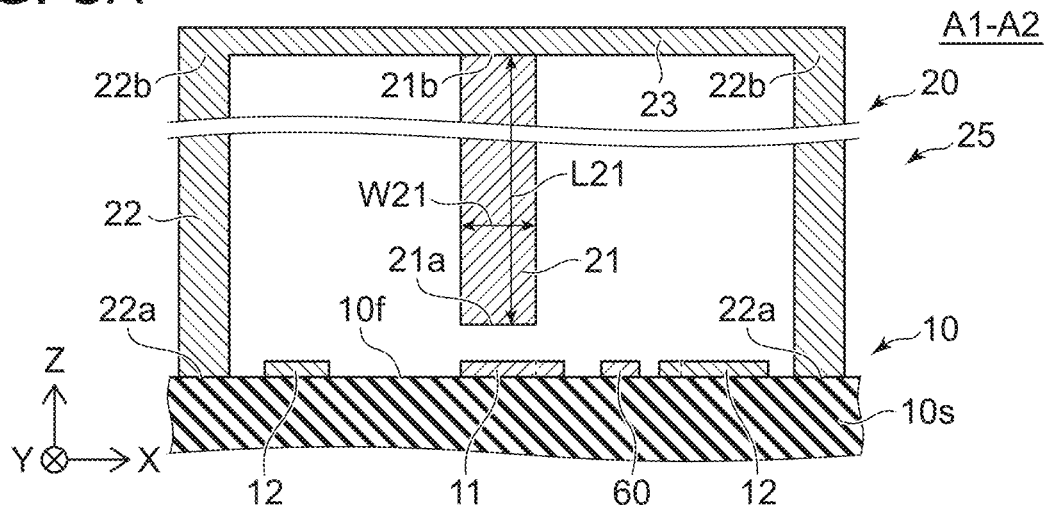
FIGS. 3A to 3C are schematic cross-sectional views illustrating the electronic circuit according to the first embodiment.
Figure 3B:
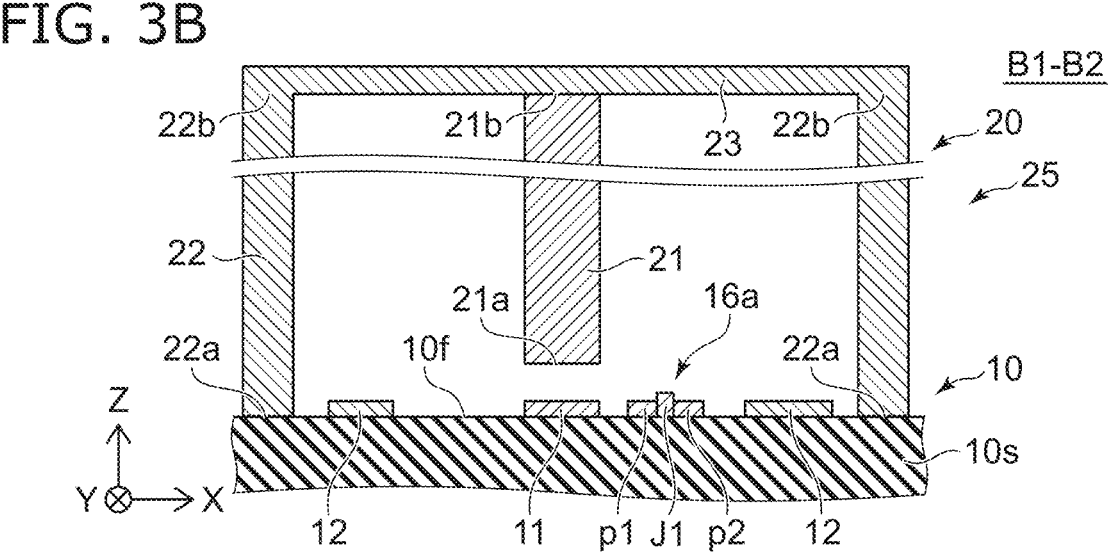
Figure 3C:
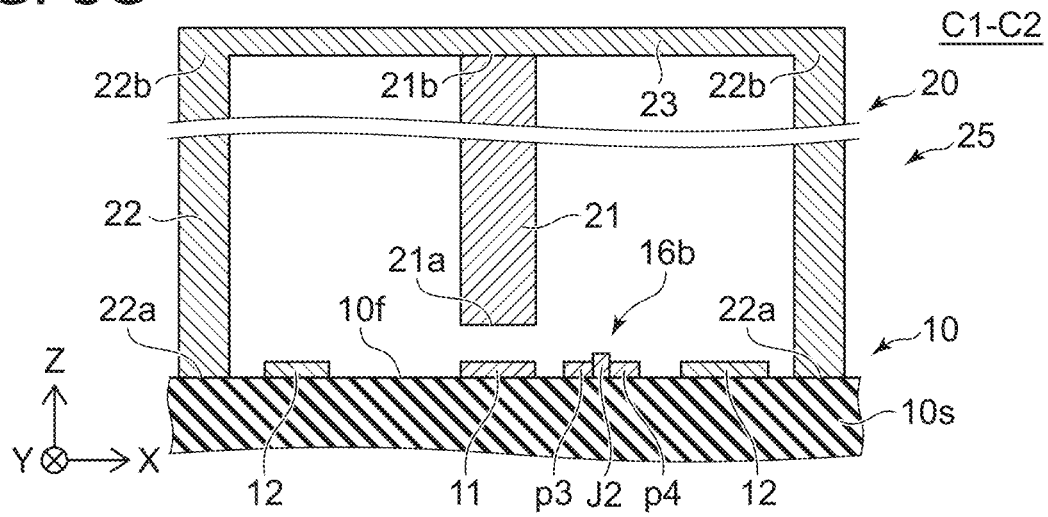

FIGS. 3A to 3C are schematic cross-sectional views illustrating the electronic circuit according to the first embodiment.

FIG. 3A is a line A1-A2 cross-sectional view of FIG. 1. FIG. 3B is a cross-sectional view at a position corresponding to line B1-B2 of FIG. 2A. FIG. 3C is a cross-sectional view at a position corresponding to line C1-C2 of FIG. 2A.

As shown in FIG. 1, the electronic circuit 110 according to the embodiment includes an element part 25. The element part 25 includes a first resonator 10 and a second resonator 20. The electronic circuit 110 may function as at least a portion of an oscillator 210.

The distance between the first resonator 10 and the second resonator 20 is enlarged in FIG. 1 for easier viewing of the drawing.

As shown in FIG. 1, the first resonator 10 includes a first conductive layer 11 and a second conductive layer 12. For example, as shown in FIG. 1, the element part 25 may include a base body 10s. The base body 10s includes a first surface 10f. For example, the first surface 10f is along the X-Y plane (a first plane). For example, the first conductive layer 11 and the second conductive layer 12 are located at the first surface 10f.

One direction along the X-Y plane is taken as an X-axis direction. A direction that is along the X-Y plane and perpendicular to the X-axis direction is taken as a Y-axis direction. The direction perpendicular to the X-Y plane is taken as a Z-axis direction.

FIG. 2A illustrates the first resonator 10. As shown in FIG. 2A, the first resonator 10 includes the first conductive layer 11, the second conductive layer 12, a first current path 16a, and a second current path 16b.

The first current path 16a includes a superconductor. The first current path 16a includes a first Josephson junction J1. For example, the first current path 16a includes a first portion p1, a second portion p2, and the first Josephson junction J1. The first portion p1 includes a first end portion e1 and a first other-end portion g1. The second portion p2 includes a second end portion e2 and a second other-end portion g2. The first end portion e1 is connected with the first conductive layer 11. The second end portion e2 is connected with the second conductive layer 12. The first Josephson junction J1 is located between the first other-end portion g1 and the second other-end portion g2. The first Josephson junction J1 is connected with the first and second other-end portions g1 and g2.

The second current path 16b includes a superconductor. The second current path 16b includes a second Josephson junction J2. For example, the second current path 16b includes a third portion p3, a fourth portion p4, and the second Josephson junction J2. The third portion p3 includes a third end portion e3 and a third other-end portion g3. The fourth portion p4 includes a fourth end portion e4 and a fourth other-end portion g4. The third end portion e3 is connected with the first conductive layer 11. The fourth end portion e4 is connected with the second conductive layer 12. The second Josephson junction J2 is located between the third other-end portion g3 and the fourth other-end portion g4. The second Josephson junction J2 is connected with the third and fourth other-end portions g3 and g4.

As shown in FIG. 2B, the first portion p1, the second portion p2, and the first Josephson junction J1 are located at the first surface 10f. For example, an insulating layer 16i is located between a portion of the first portion p1 and a portion of the second portion p2. The first Josephson junction J1 is formed of the portion of the first portion p1, the portion of the second portion p2, and the insulating layer 16i. Thus, the superconductor first current path 16a is located at the first surface 10f.

As shown in FIG. 2C, the third portion p3, the fourth portion p4, and the second Josephson junction J2 are located at the first surface 10f. For example, an insulating layer 16j is located between a portion of the third portion p3 and a portion of the fourth portion p4. The second Josephson junction J2 is formed of the portion of the third portion p3, the portion of the fourth portion p4, and the insulating layer 16j. The insulating layer 16j may be continuous with the insulating layer 16i. Thus, the superconductor second current path 16b is located at the first surface 10f. The first plane (the X-Y plane) includes the first current path 16a and the second current path 16b.

In the example as shown in FIGS. 1 and 2A, the second conductive layer 12 is located around the first conductive layer 11 along the first plane (the X-Y plane). In the example, the second conductive layer 12 has a ring shape surrounding the first conductive layer 11. The planar shape (the shape in the X-Y plane) of the first conductive layer 11 is, for example, circular (which may include elliptical). The planar shape of the second conductive layer 12 has a circular-ring shape. The first current path 16a and the second current path 16b extend substantially along a radial direction along the first plane (the X-Y plane) having the first conductive layer 11 as the center. According to the embodiment, various modifications of the planar shapes of the first conductive layer 11, the second conductive layer 12, the first current path 16a, and the second current path 16b are possible.

For example, a dc-SQUID (superconducting quantum interference device) is formed of the first and second current paths 16a and 16b. A magnetic field may be applied to a space SP surrounded with the first and second current paths 16a and 16b. The first resonator 10 is, for example, a nonlinear resonator. For example, the space SP that is surrounded with the first and second current paths 16a and 16b corresponds to a SQUID loop. The first current path 16a and the second current path 16b are around the space through which the applied magnetic field passes.

The second resonator 20 is electromagnetically coupled with the first resonator 10. For example, the second resonator 20 can be capacitively coupled with the first resonator 10. The electromagnetic coupling includes, for example, at least one of electric field coupling or magnetic field coupling. The electromagnetic coupling may include, for example, at least one of capacitive coupling or inductive coupling.

For example, the second resonator 20 is a linear resonator. For example, the second resonator 20 does not include a Josephson junction.

In the example as shown in FIG. 1, the second resonator 20 includes a first conductive part 21 and a second conductive part 22. At least a portion of the first conductive part 21 extends along a first direction. The first direction crosses the first plane (the X-Y plane). The first direction is, for example, a Z-axis direction.

In the example, the second conductive part 22 is located around the first conductive part 21 in the first plane (the X-Y plane). The second resonator 20 is, for example, a coaxial resonator that includes a superconductor. The axis of the coaxial resonator is along the first direction (the Z-axis direction).

The first conductive part 21 includes a first conductive part end 21a and a first conductive part other end 21b. The first conductive part end 21a faces to the first resonator 10. The direction from the first conductive part end 21a toward the first conductive part other end 21b is along the first direction (the Z-axis direction). The first conductive part end 21a is separated from the first resonator 10 in the first direction. The first conductive part end 21a is between the first resonator 10 and the first conductive part other end 21b in the first direction.

The second conductive part 22 includes a second conductive part end 22a and a second conductive part other end 22b. The second conductive part end 22a faces the first resonator 10. The direction from the second conductive part end 22a toward the second conductive part other end 22b is along the first direction (the Z-axis direction). As described below, the second conductive part end 22a may contact a portion of the first resonator 10. The second conductive part end 22a is between the first resonator 10 and the second conductive part other end 22b in the first direction.

According to the embodiment as shown in FIGS. 3A to 3C, at least a portion between the first conductive part 21 and the second conductive part 22 may be a gap. At least a portion between the first resonator 10 and the second resonator 20 may be a gap. The first conductive part other end 21b may be electrically connected with the second conductive part other end 22b. For example, the first conductive part other end 21b may be electrically connected with the second conductive part other end 22b by a conductive member 23. The boundaries between the first conductive part other end 21b, the second conductive part other end 22b, and the conductive member 23 may be distinct or indistinct. The Josephson junctions are simplified in FIGS. 3A to 3C for easier viewing of the drawing.

As shown in FIG. 3A, the length in the first direction (the Z-axis direction) of the first conductive part 21 is taken as a length L21. The length (the width) of the first conductive part 21 in a direction along a second direction is taken as a length W21. The second direction is along the first plane (the X-Y plane). The second direction passes through the center of the first conductive part 21 in the first plane. The second direction is a radial direction. The second direction may be, for example, the X-axis direction. The length L21 may be the maximum length of the first conductive part 21 in the first direction. The length L21 may be the maximum length of the first conductive part 21 in a direction perpendicular to the first direction. For example, the length L21 is greater than the length W21. For example, the length L21 is greater than 1 times and not more than 100 times the length W21. For example, the length L21 is not less than 2 times the length W21. In one example, the length L21 is not less than 1 mm and not more than 10 mm. In one example, the length W21 is not less than 0.1 mm but less than 1 mm.

According to the embodiment, a qubit is formed of the first and second resonators 10 and 20. For example, the element part 25 functions as one qubit. For example, the qubit is represented by utilizing eigenstates of the coupled system of the first and second resonators 10 and 20.

The first resonator 10 and the second resonator 20 are electromagnetically coupled to each other. For example, the capacitance (described below) that is formed in the first resonator 10 can be reduced by such a configuration. For example, the size of the first resonator 10 in the X-Y plane can be reduced. According to the embodiment, an electronic circuit and an oscillator can be provided in which downsizing is possible. For example, the element part 25 of the electronic circuit 110 may be utilized as a qubit of a nonlinear oscillator (a Kerr parametric oscillator (KPO)). For example, the loss can be reduced.

According to the embodiment as shown in FIG. 1, the direction from the first resonator 10 toward the second resonator 20 is along the first direction (e.g., the Z-axis direction). The first direction crosses the first plane (the X-Y plane) that includes the first and second current paths 16a and 16b. For example, the first plane is along the first surface 10f of the base body 10s.

For example, at least a portion of the second resonator 20 overlaps the first resonator 10 in the Z-axis direction. For example, the second resonator 20 overlaps the first resonator 10 when the second resonator 20 is projected onto the X-Y plane that includes the first resonator 10. The size of the element part 25 that includes the first and second resonators 10 and 20 in the X-Y plane is easily reduced thereby. An electronic circuit and an oscillator can be provided in which downsizing is possible.

According to the embodiment, the first conductive layer 11, the second conductive layer 12, the first portion p1, and the second portion p2 include, for example, superconducting niobium. The first conductive part 21 that is included in the second resonator 20 includes, for example, superconducting aluminum.

As shown in FIG. 1, the electronic circuit 110 (and the oscillator 210) may include a first conductive member 60. In one example, at least a portion of the first conductive member 60 is along the first plane (the X-Y plane). As shown in FIGS. 1 and 3A, the position in the first direction (the Z-axis direction) of at least a portion of the first conductive member 60 is between the position in the first direction (the Z-axis direction) of the base body 10s and the position in the first direction (the Z-axis direction) of the second resonator 20. For example, the position in the first direction (the Z-axis direction) of at least a portion of the first conductive member 60 is between the position in the first direction (the Z-axis direction) of the first resonator 10 and the position in the first direction (the Z-axis direction) of the second resonator 20. Examples of the first conductive member 60 are described below.

Figure 4:
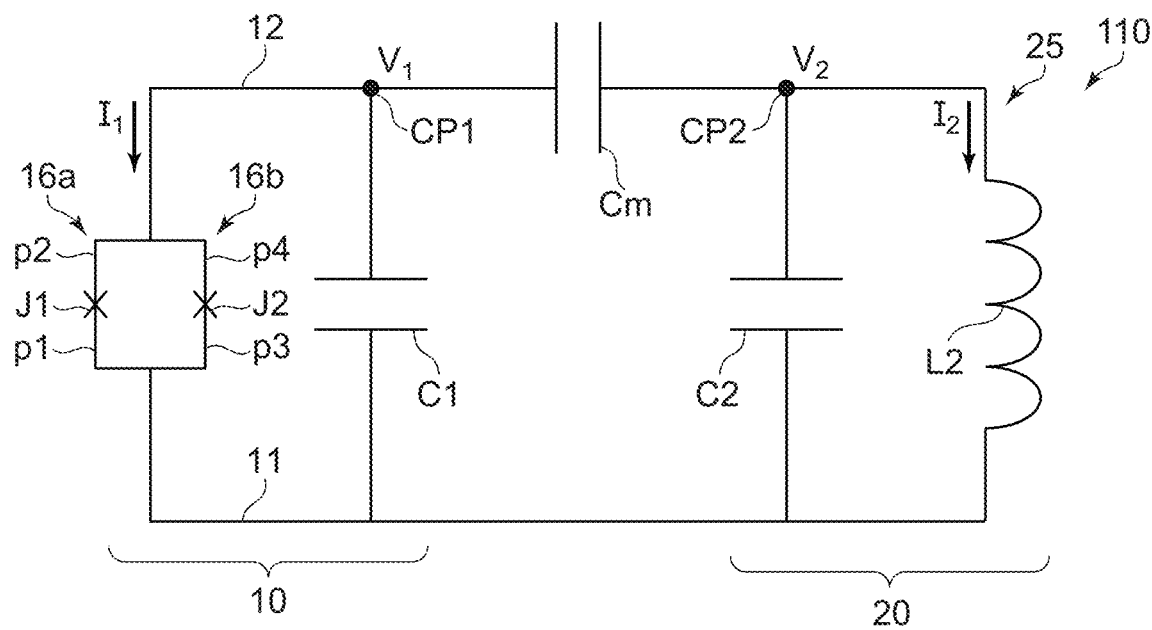
FIG. 4 is a circuit diagram illustrating the electronic circuit according to the first embodiment.

FIG. 4 is a circuit diagram illustrating the electronic circuit according to the first embodiment.

As shown in FIG. 4, the electronic circuit 110 includes the first resonator 10 and the second resonator 20. The first resonator 10 includes the first conductive layer 11, the second conductive layer 12, the first current path 16a, and the second current path 16b described above. A first capacitance C1 may be formed in the first resonator 10. One end of the first capacitance C1 is electrically connected to the first conductive layer 11. The other end of the first capacitance C1 is electrically connected to the second conductive layer 12. The first capacitance C1 is arranged in parallel with the circuit (the dc-SQUID) that includes the first and second current paths 16a and 16b. The connection point between the second conductive layer 12 and the other end of the first capacitance C1 is taken as a first connection point CP1.

The second resonator 20 includes, for example, a second capacitance C2 and an inductance L2. The second capacitance C2 and the inductance L2 are formed of the first and second conductive parts 21 and 22 described above. The second capacitance C2 and the inductance L2 are connected in parallel with each other. One end of the second capacitance C2 and one end of the inductance L2 are electrically connected to the first conductive layer 11. The connection point between the other end of the second capacitance C2 and the other end of the inductance L2 is taken as a second connection point CP2.

For example, the first resonator 10 and the second resonator 20 are coupled via a capacitance Cm. For example, the size of the capacitance Cm is dependent on the distance between the two resonators, the sizes of the resonators, the dielectric constant in the space between the two resonators, etc.

Figure 5:
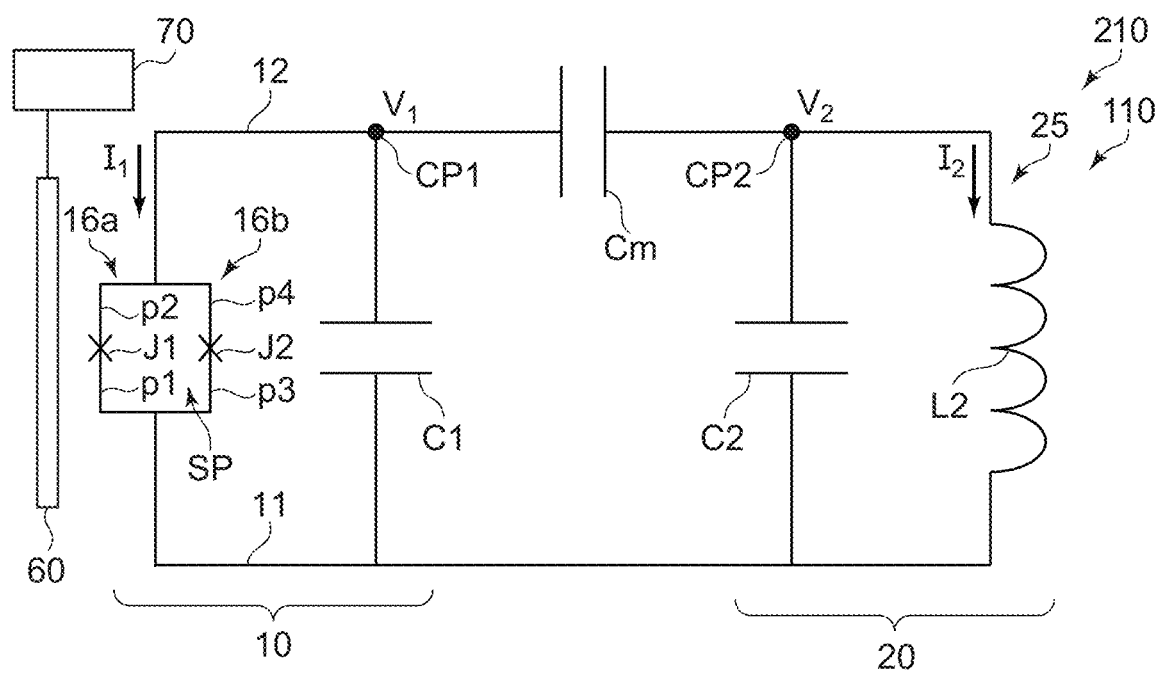
FIG. 5 is a circuit diagram illustrating the electronic circuit according to the first embodiment.

FIG. 5 is a circuit diagram illustrating the electronic circuit according to the first embodiment.

As shown in FIG. 5, the electronic circuit 110 may further include the first conductive member 60. For example, an electrical signal (e.g., an AC signal such as a microwave) is supplied from a controller 70 to the first conductive member 60. The electrical signal may include at least one of a DC signal or an AC signal. The electrical signal may be, for example, a signal that includes a DC component and an AC component. The electrical signal includes, for example, a microwave. A magnetic field that corresponds to the current (the electrical signal) flowing in the first conductive member 60 is emitted from the first conductive member 60. The magnetic field is applied to the first resonator 10. For example, at least a portion of the magnetic field is applied to the space SP (the SQUID loop) surrounded with the first and second current paths 16a and 16b.

Thus, the controller 70 is configured to supply an electrical signal to the first conductive member 60. For example, the controller 70 is configured to modify the frequency of the electrical signal. The element part 25 oscillates when the controller 70 supplies the electrical signal (e.g., the signal including the AC component) to the first conductive member 60. The oscillation frequency of the element part 25 changes according to the change of the frequency of the electrical signal.

For example, the electrical signal may include a DC component and an AC component. For example, the AC component corresponds to a modulated magnetic field. The frequency (the modulation frequency) of the AC component is, for example, 2 times the oscillation frequency of the element part 25. The oscillation frequency of the element part 25 is ½ of the AC component (the modulation frequency) of the electrical signal. By applying such an electrical signal, for example, the first resonator 10 and the second resonator 20 function as a KPO.

For example, a first current $I_1$ flows in the first and second conductive layers 11 and 12. For example, the potential of the first connection point CP1 is a first voltage $V_1$ when referenced to the potential of the first conductive layer 11. For example, a second current $I_2$ flows in the inductance L2. The potential of the second connection point CP2 is a second voltage $V_2$.

The first current $I_1$ and the first voltage $V_1$ are represented by the following first to fifth formulas.

$$I_1 = I'_c \sin\eta = I'_c \sin\frac{\phi}{\phi_0} \quad (1)$$

$$V_1 = \phi_0 \frac{d\eta}{dt} = \frac{d\phi}{dt} \quad (2)$$

$$I'_c = 2I_c \cos\left(\pi\frac{\Phi}{\Phi_0}\right) \quad (3)$$

$$\phi_0 = \frac{\Phi_0}{2\pi} \quad (4)$$

$$\phi = \frac{\Phi}{2\pi} \quad (5)$$

In the description described above, "η" is the phase difference of the wave function before and after the Josephson junction. "$I_c$" is the critical current of the Josephson junction. Φ is the magnetic flux inside the SQUID loop. "$\Phi_0$" is the flux quantum. "$I'_c$" is the effective critical current of the dc-SQUID. The physical quantities $\Phi_0$ and $\phi$ are represented by the fourth and fifth formulas. "π" is pi. "t" is time.

It can be seen from the first and second formulas that the current and the voltage are modulated by changing the magnetic flux inside the loop.

Figure 6A:
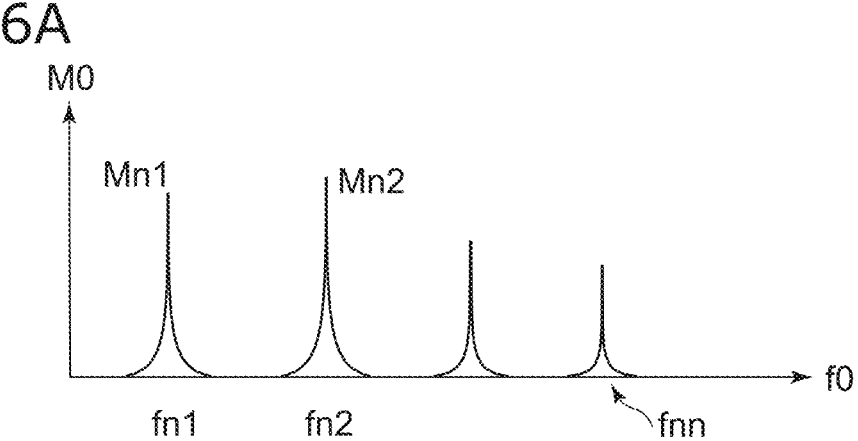
FIGS. 6A and 6B are schematic views illustrating characteristics of the electronic circuit according to the first embodiment.
Figure 6B:
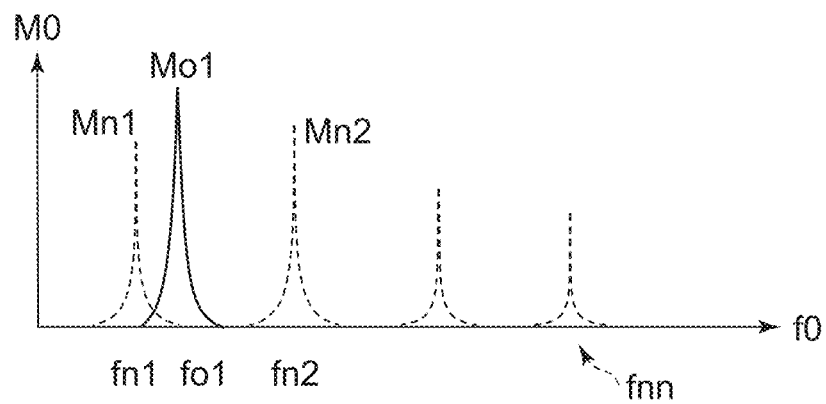

FIGS. 6A and 6B are schematic views illustrating characteristics of the electronic circuit according to the first embodiment.

In these figures, the horizontal axis is a frequency f0. In these figures, the vertical axis corresponds to an intensity MO of the signal. FIG. 6A illustrates resonance characteristics of the element part 25 that includes the first and second resonators 10 and 20. FIG. 6B illustrates oscillation characteristics of the element part 25 when the modulated magnetic field is applied inside the SQUID loop. The oscillation frequency of the element part 25 is ½ of the frequency of the modulated magnetic field.

As shown in FIG. 6A, the element part 25 includes multiple natural frequencies fnn. The multiple natural frequencies fnn include a first natural frequency fn1, a second natural frequency fn2, etc. The multiple natural frequencies fnn may include, for example, harmonic natural frequencies. The second natural frequency fn2 is nearest the first natural frequency fn1 among the multiple natural frequencies fnn. In one example, the first natural frequency fn1 may be the lowest among the multiple natural frequencies fnn.

As shown in FIG. 6B, the element part 25 oscillates when the AC signal is supplied to the first conductive member 60. The frequency of the oscillation is an oscillation frequency fo1; and the intensity of the oscillation is an oscillation intensity Mot. It is favorable for the difference between the oscillation frequency fo1 and one of the multiple natural frequencies fnn of the element part 25 (in the example, for example, the first natural frequency fn1) to be not more than 10 times the frequency corresponding to the Kerr coefficient of the first resonator 10. For example, a stable oscillation is obtained thereby.

For example, it is favorable for the difference between the oscillation frequency fo1 and the first natural frequency fn1 to be not more than ½ of the difference between the first natural frequency fn1 and the second natural frequency fn2. For example, a stable oscillation is obtained thereby. In such a case, it is favorable for the first natural frequency fn1 to be the lowest among the multiple natural frequencies fnn of the element part 25. For example, a stable oscillation is obtained thereby.

For example, the one of the multiple natural frequencies fnn (e.g., the first natural frequency fn1) may be nearest the oscillation frequency fo1 among the multiple natural frequencies fnn of the element part 25. Another one of the multiple natural frequencies fnn of the element part 25 (e.g., the second natural frequency fn2) may be nearest the aforementioned one of the multiple natural frequencies fnn (e.g., the first natural frequency fn1). For example, it is favorable for the difference between the oscillation frequency fo1 and the aforementioned one of the multiple natural frequencies fnn to be not more than ½ of the difference between the aforementioned one of the multiple natural frequencies fnn and the aforementioned other one of the multiple natural frequencies fnn of the element part 25.

It is favorable for the aforementioned one of the multiple natural frequencies fnn (nearest the oscillation frequency fo1) to be the lowest among the multiple natural frequencies fnn. For example, the eigenstates are dense at the high-order modes. Unnecessary modes are suppressed by setting the oscillation frequency fo1 to be low and by setting the aforementioned one of the multiple natural frequencies fnn corresponding to the oscillation frequency fo1 to be of a low order.

For example, the first resonator 10 of the element part 25 can function as a nonlinear oscillator (KPO).

Multiple states (e.g., a first state and a second state) can be formed in the electronic circuit 110 and the oscillator 210 according to the embodiment. For example, as described below, these states can be formed by causing a control probe to approach the element part 25 and by applying an AC electromagnetic field (e.g., a microwave) from the probe to the element part 25. The element part 25 is vibrationally excited by a first AC signal (e.g., a microwave) including the first natural frequency fn1 in the first state. The element part 25 is vibrationally excited by a second AC signal (e.g., a microwave) including the second natural frequency fn2 in the second state. The standing waves of these states can be detected by another probe, etc.

In one example, an AC electromagnetic field (e.g., a microwave) based on the first AC signal including the first natural frequency fn1 is applied to the element part 25 in the first state. The vibrational excitation is performed thereby. In one example, an AC electromagnetic field based on the second AC signal including the second natural frequency fn2 is applied to the element part 25 in the second state. The vibrational excitation is performed thereby.

The intensity of the first AC signal is taken to be substantially equal to the intensity of the second AC signal in such first and second states. Examples of the oscillation characteristics of the element part 25 in such states will now be described. Practically, the absolute value of the difference between the intensity of the first AC signal and the intensity of the second AC signal may be not more than 1% of the intensity of the first AC signal. The difference between the intensity of the first AC signal and the intensity of the second AC signal may include differences due to fluctuation of characteristics of the circuit that supplies these AC signals and the fluctuation of the conductive members and the like located between the circuit and the element part.

Figure 7A:
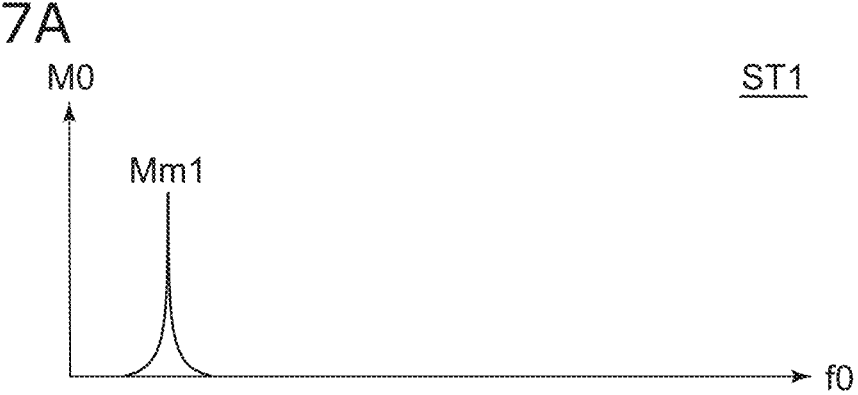
FIGS. 7A and 7B are schematic views illustrating characteristics of the electronic circuit according to the first embodiment.
Figure 7B:
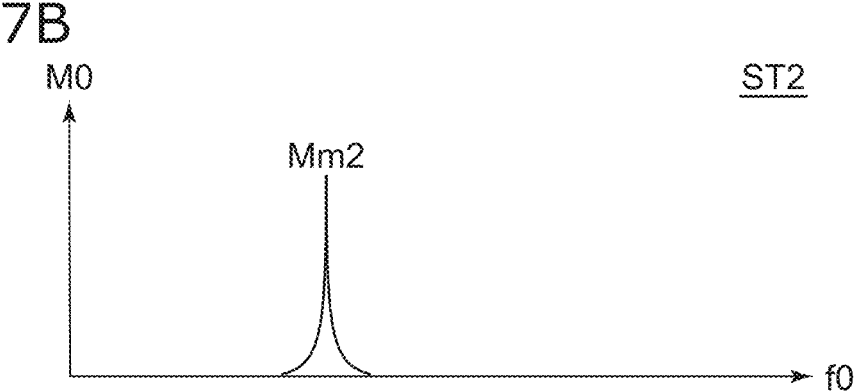

FIGS. 7A and 7B are schematic views illustrating characteristics of the electronic circuit according to the first embodiment.

FIG. 7A corresponds to the first state ST1. FIG. 7B corresponds to the second state ST2. These figures illustrate characteristics of the standing waves generated in the second resonator 20 in these states. In these figures, the horizontal axis is the frequency f0. In these figures, the vertical axis corresponds to the intensity MO of the signal of the detected standing wave.

As shown in FIG. 7A, the electric field amplitude of the standing wave generated in the second resonator 20 in the first state ST1 (the vibrational excitation due to the first AC signal including the first natural frequency fn1) is a first electric field amplitude (an intensity Mm1). As shown in FIG. 7B, the electric field amplitude of the standing wave generated in the second resonator 20 in the second state ST2 (the vibrational excitation due to the second AC signal including the second natural frequency fn2) is a second electric field amplitude (an intensity Mm2). The ratio of the second electric field amplitude (the intensity Mm2) to the first electric field amplitude (the intensity Mm1) is taken as a first ratio tan($\theta$). The parameter $\theta$ (degrees) is not less than $-90$ degrees and not more than 0 degrees. For example, the first ratio tan($\theta$) is dependent on the strength of the coupling between the first resonator 10 and the second resonator 20.

On the other hand, the ratio of the second natural frequency fn2 to the first natural frequency fn1 is taken as a second ratio sin(a). The parameter $\alpha$ (degrees) is not less than 0 degrees and not more than 90 degrees.

The aforementioned $\theta$ and $\alpha$ are changed by modifying the characteristics of the coupling of the element part 25 that includes the first and second resonators 10 and 20.

For example, the parameter $\theta$ is defined by an eigenvector of a matrix defined by the coupling coefficient and the frequencies of the resonators when not coupled. For example, the parameter $\theta$ can be represented by the following sixth formula.

$$\begin{pmatrix} \frac{1}{\omega_{01}'^2} & -\frac{k'}{\omega_{01}'\omega_{02}'} \\ -\frac{k'}{\omega_{01}'\omega_{02}'} & \frac{1}{\omega_{02}'^2} \end{pmatrix} = \begin{pmatrix} \cos\theta & \sin\theta \\ -\sin\theta & \cos\theta \end{pmatrix} \begin{pmatrix} \frac{1}{\omega_-^2} & 0 \\ 0 & \frac{1}{\omega_+^2} \end{pmatrix} \begin{pmatrix} \cos\theta & -\sin\theta \\ \sin\theta & \cos\theta \end{pmatrix} \quad (6)$$

The parameter $\alpha$ is defined by the ratio of the natural frequencies of the element part 25 (the coupling resonator). For example, the parameter $\alpha$ can be represented by the following seventh formula.

$$\frac{1}{\omega_+^2} = \frac{1}{\omega_-^2}\sin^2\alpha \quad (7)$$

In the sixth formula, "$\omega_{01}'$" is the resonant frequency of the first resonator 10 including the capacitance Cm (the mutual capacitance) with the second resonator 20. The relationship of $1/\omega_{01}'^2 = L1(Cx1+Cm)$ holds, where "L1" is the equivalent inductance of the SQUID. "Cx1" is the value of the first capacitance C1. "$\omega_{02}'$" is the resonant frequency of the second resonator 20 including the capacitance Cm with the first resonator 10. The relationship of $1/\omega_{02}'^2 = L1(Cx2+Cm)$ holds. "Cx2" is the value of the second capacitance C2. "k'" is the effective coupling coefficient. The relationship of $k' = Cm/\{(Cx1+Cm)(Cx2+Cm)\}^{1/2}$ holds.

Examples of simulation results related to the parameter $\theta$ and the parameter $\alpha$ will now be described.

Figure 8A:
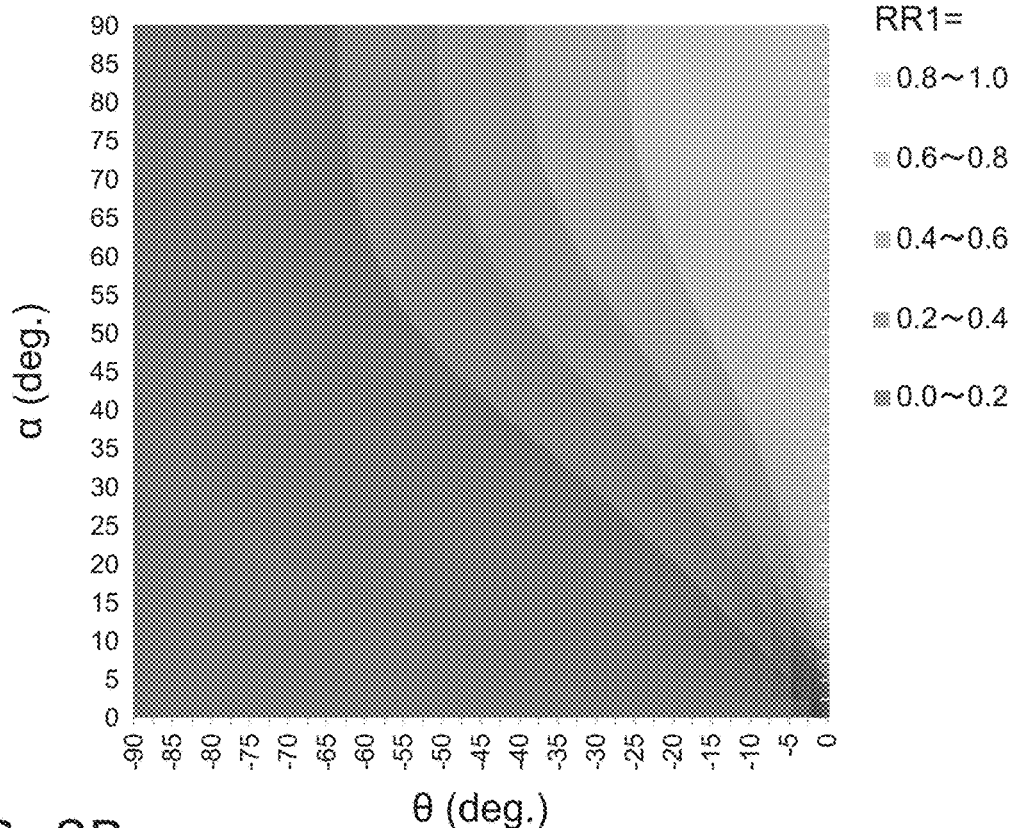
FIGS. 8A and 8B are schematic views illustrating characteristics of the electronic circuit according to the first embodiment.
Figure 8B:
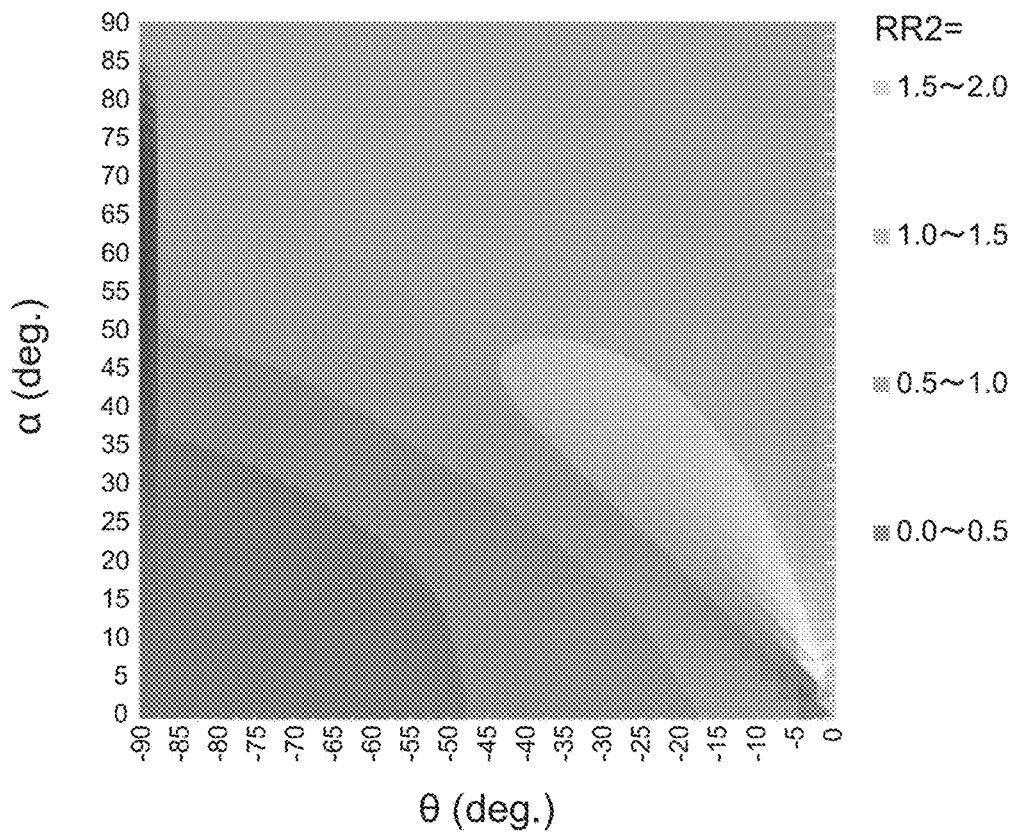

FIGS. 8A and 8B are schematic views illustrating characteristics of the electronic circuit according to the first embodiment.

In these figures, the horizontal axis is the parameter $\theta$. In these figures, the vertical axis is the parameter $\alpha$. In FIGS. 8A and 8B, the oscillation frequency (½ of the frequency of the first AC signal) is near the lowest frequency among the multiple natural frequencies of the element part 25 (the coupling resonator).

The value of the first capacitance C1 of the element part 25 (the coupling resonator) that includes the first and second resonators 10 and 20 is taken as a first value. The value of the first capacitance C1 of the element part 25 (the coupling resonator) that does not include the second resonator 20 is taken as a second value. The ratio of a parametric pumping rate P to the Kerr coefficient in the element part 25 (the coupling resonator) that includes the first and second resonators 10 and 20 is set to be equal to the ratio of the parametric pumping rate P to the Kerr coefficient in the element part 25 (the coupling resonator) that does not include the second resonator 20. The concentration of the image of FIG. 8A corresponds to a first evaluation ratio RR1 of the first value to the second value. The concentration of the image is high when the first evaluation ratio RR1 is low. The concentration of the image is low when the first evaluation ratio RR1 is high.

It can be seen from FIG. 8A that the first evaluation ratio RR1 of the first value to the second value is less than 1 for any parameter $\theta$ and any parameter $\alpha$. Compared to when the second resonator 20 is not included, the value of the first capacitance C1 is smaller in the element part 25 that includes the first and second resonators 10 and 20. According to the embodiment, a small value of the first capacitance C1 is obtained.

K/γ of the element part 25 (the coupling resonator) that includes the first and second resonators 10 and 20 is taken as a third value. K/γ of the element part 25 (the coupling resonator) that does not include the second resonator 20 is taken as a fourth value. "K" is the Kerr coefficient. "γ" is the loss rate. As described above, the ratio of the parametric pumping rate P to the Kerr coefficient in the element part 25 (the coupling resonator) that includes the first and second resonators 10 and 20 is set to be equal to the ratio of the parametric pumping rate P to the Kerr coefficient in the element part 25 (the coupling resonator) that does not include the second resonator 20. It is favorable for K/γ to be high when the ratios are set to be the same.

The concentration of the image of FIG. 8B corresponds to a second evaluation ratio RR2 of the third value to the fourth value. The concentration of the image is high when the second evaluation ratio RR2 is low. The concentration of the image is low when the second evaluation ratio RR2 is high.

It can be seen from FIG. 8B that a region exists in which the second evaluation ratio RR2 is greater than 1. In other words, compared to when the second resonator 20 is not included, the value of K/γ can be increased in the element part 25 that includes the first and second resonators 10 and 20.

Figure 9A:
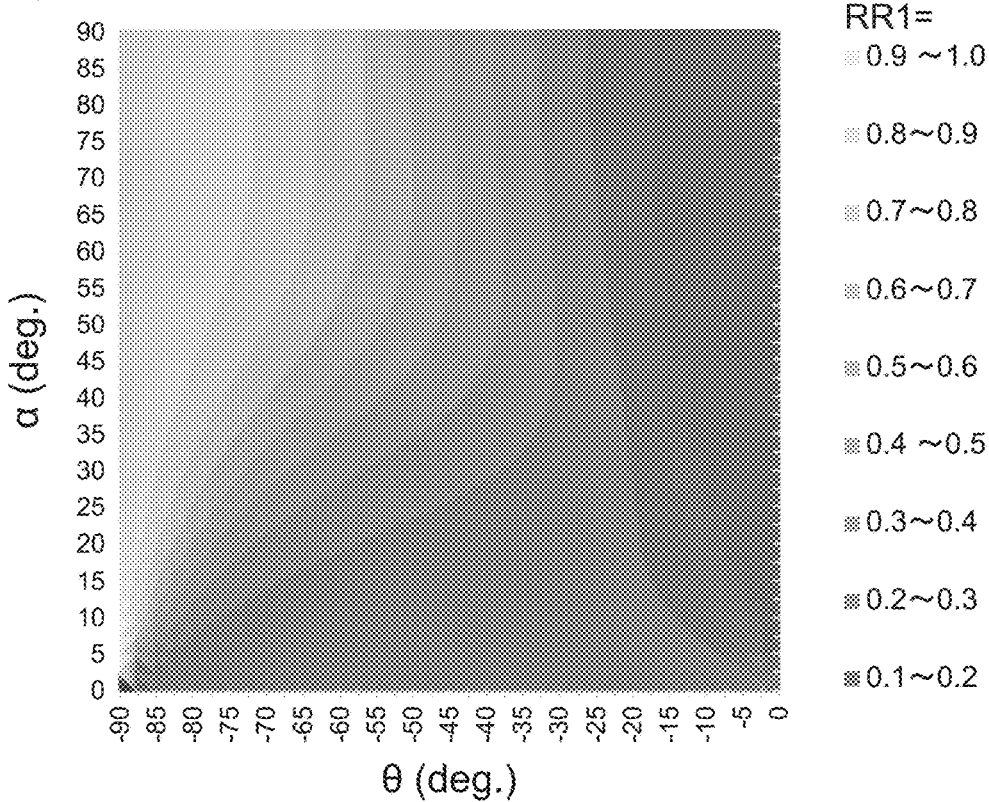
FIGS. 9A and 9B are schematic views illustrating characteristics of the electronic circuit according to the first embodiment.
Figure 9B:
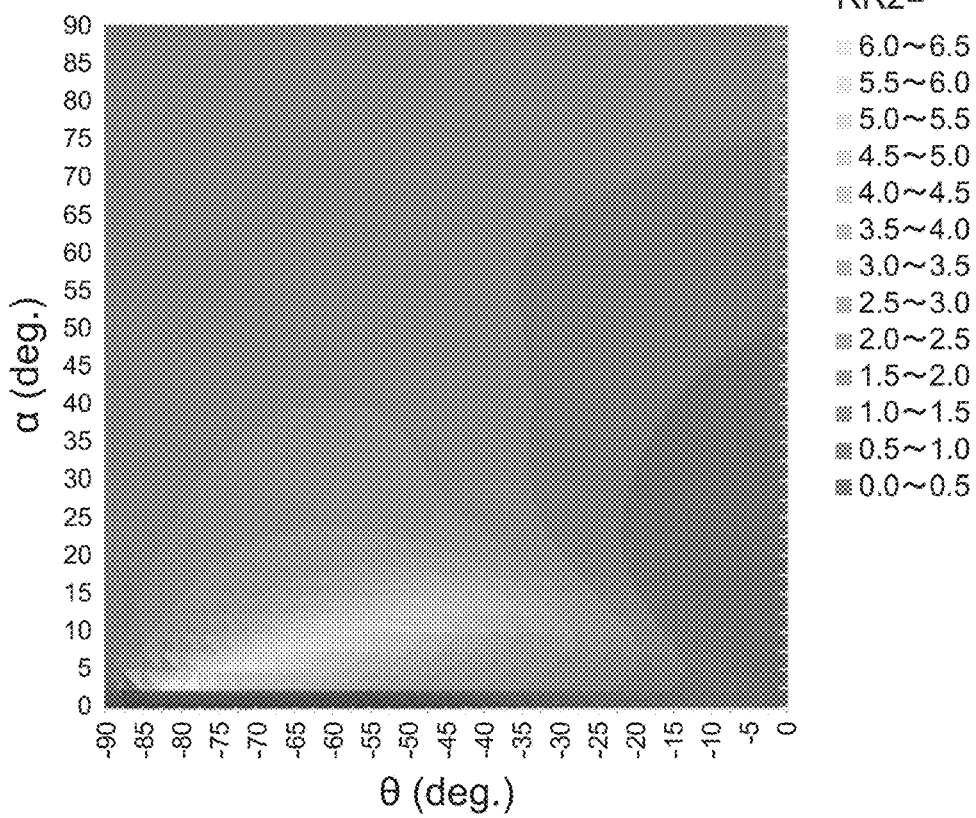

FIGS. 9A and 9B are schematic views illustrating characteristics of the electronic circuit according to the first embodiment.

In FIGS. 9A and 9B, the oscillation frequency (½ of the frequency of the first AC signal) is near the second lowest frequency among the multiple oscillation frequencies of the element part 25 (the coupling resonator).

The concentration of the image of FIG. 9A corresponds to the first evaluation ratio RR1 described above. The concentration of the image is high when the first evaluation ratio RR1 is low. The concentration of the image is low when the first evaluation ratio RR1 is high.

It can be seen from FIG. 9A that the first evaluation ratio RR1 of the first value to the second value is less than 1 for any parameter θ and any parameter α. Compared to when the second resonator 20 is not included, the value of the first capacitance C1 is smaller in the element part 25 that includes the first and second resonators 10 and 20. According to the embodiment, a small value of the first capacitance C1 is obtained.

The concentration of the image of FIG. 9B corresponds to the second evaluation ratio RR2 described above. The concentration of the image is high when the second evaluation ratio RR2 is low. The concentration of the image is low when the second evaluation ratio RR2 is high.

It can be seen from FIG. 9B that a region exists in which the second evaluation ratio RR2 is greater than 1. In other words, compared to when the second resonator 20 is not included, the value of K/γ can be increased in the element part 25 that includes the first and second resonators 10 and 20.

FIGS. 10 to 13 are schematic views illustrating characteristics of the electronic circuit according to the first embodiment.

Figure 10:
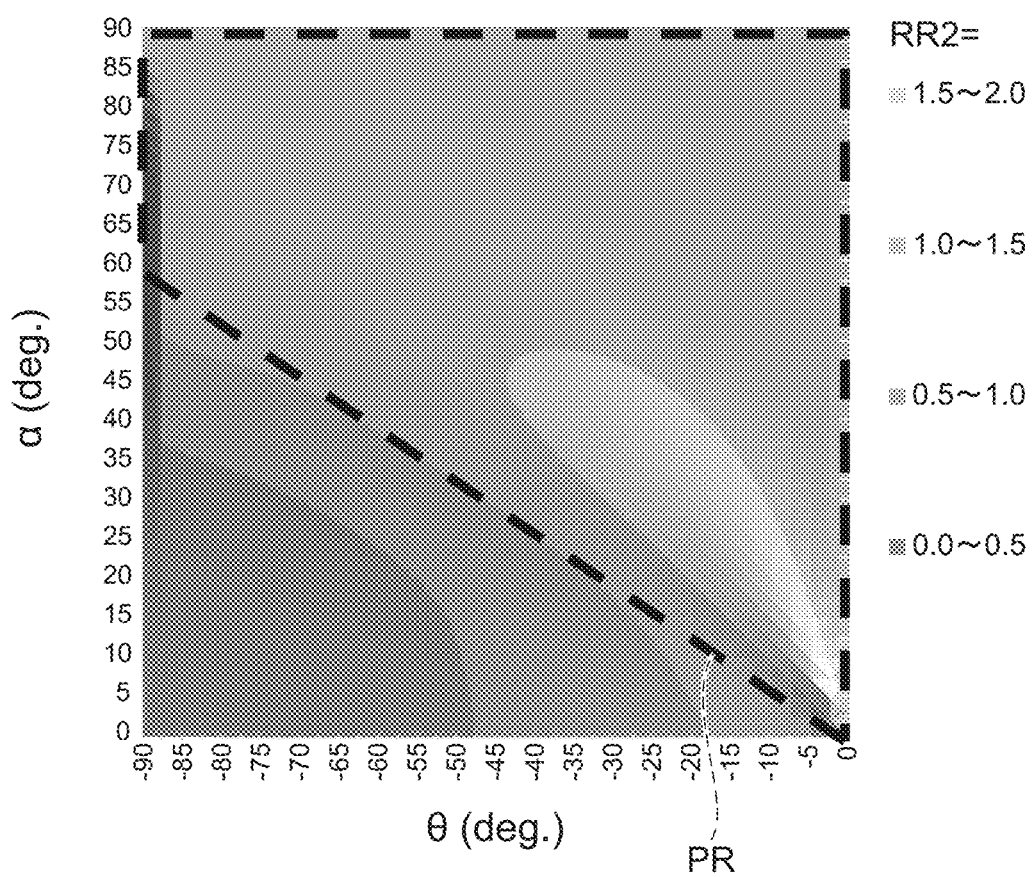
FIG. 10 is a schematic view illustrating characteristics of the electronic circuit according to the first embodiment.
Figure 11:
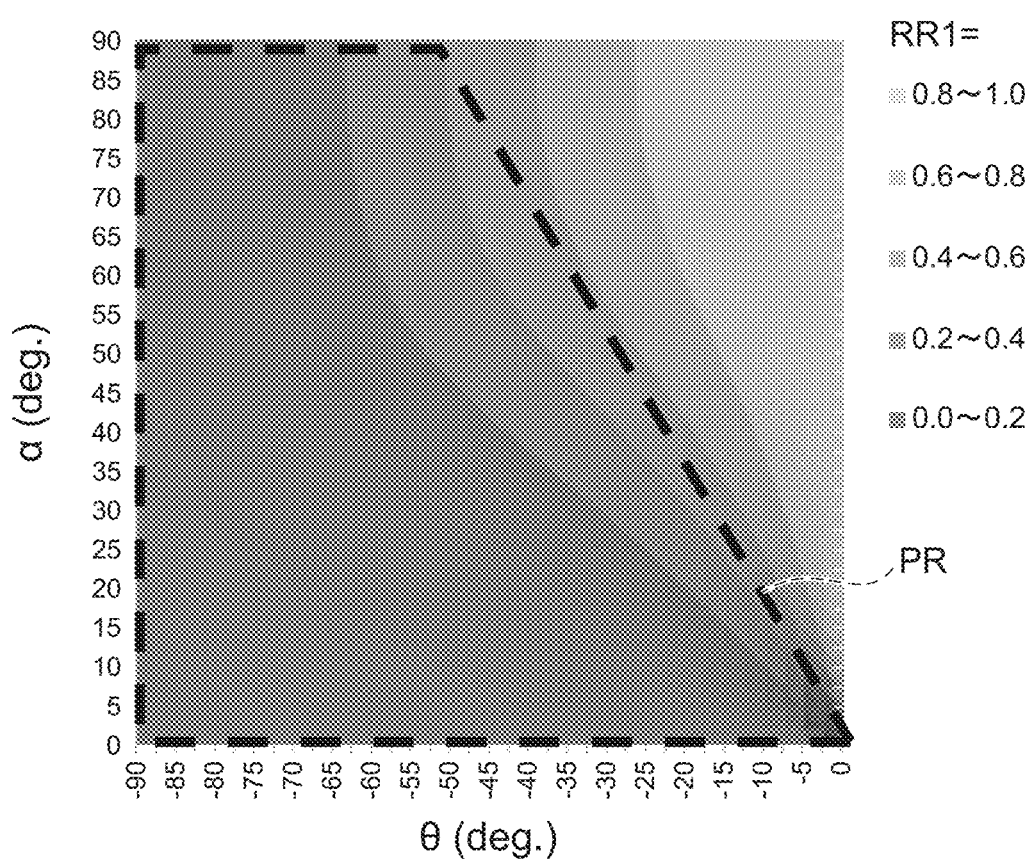
FIG. 11 is a schematic view illustrating characteristics of the electronic circuit according to the first embodiment.
Figure 12:
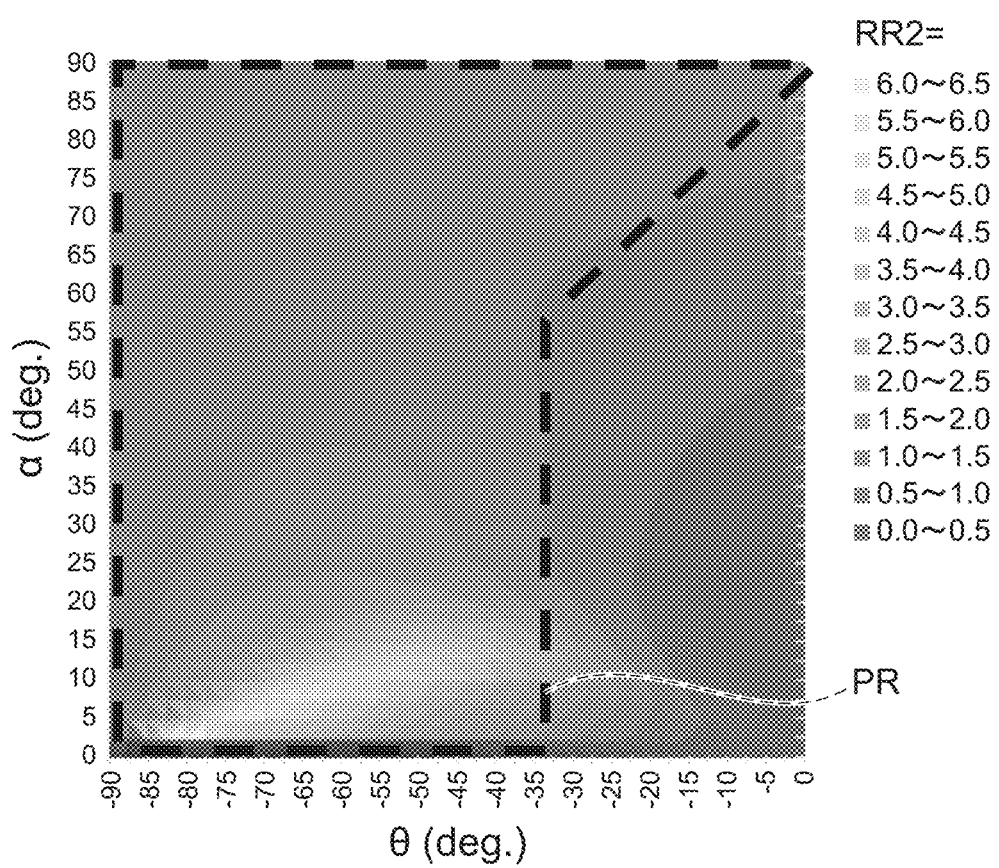
FIG. 12 is a schematic view illustrating characteristics of the electronic circuit according to the first embodiment.
Figure 13:
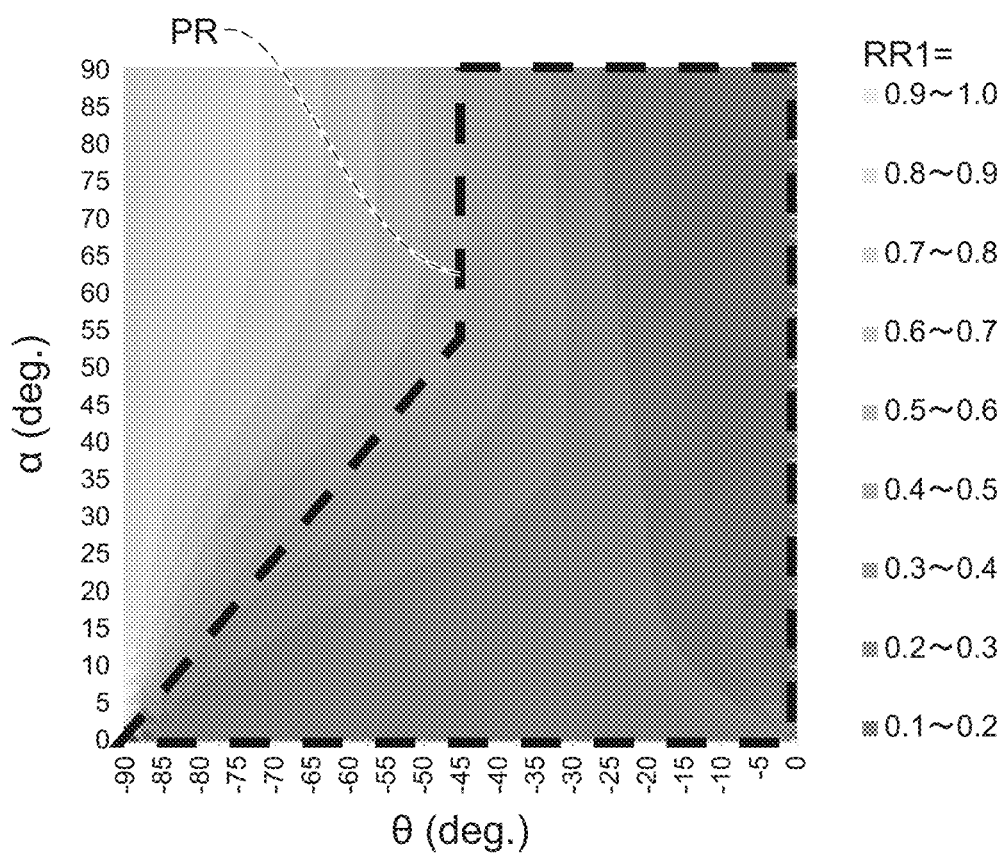
FIG. 13 is a schematic view illustrating characteristics of the electronic circuit according to the first embodiment.

In FIG. 10, a favorable region PR is illustrated in the same image as FIG. 8B. In FIG. 11, the favorable region PR is illustrated in the same image as FIG. 8A. In FIG. 12, the favorable region PR is illustrated in the same image as FIG. 9B. In FIG. 13, the favorable region PR is illustrated in the same image as FIG. 9A.

As shown in FIG. 10, it is favorable for the parameter α to be greater than −⅔ times the parameter θ. For example, the loss is more easily reduced thereby.

As shown in FIG. 11, it is favorable for the parameter α to be less than −9/5 times the parameter θ. For example, downsizing is easier thereby.

As shown in FIG. 12, for example, it is favorable for the parameter θ to be less than −35 degrees. Or, it is favorable for the parameter α to be greater than the sum of the parameter θ and 90 degrees. For example, the loss is more easily reduced thereby.

As shown in FIG. 13, for example, it is favorable for the parameter θ to be greater than −45 degrees. Or, it is favorable for the parameter α to be greater than the sum of 108 degrees and 90/75 times the parameter θ. For example, downsizing is easier thereby.

Figure 14:
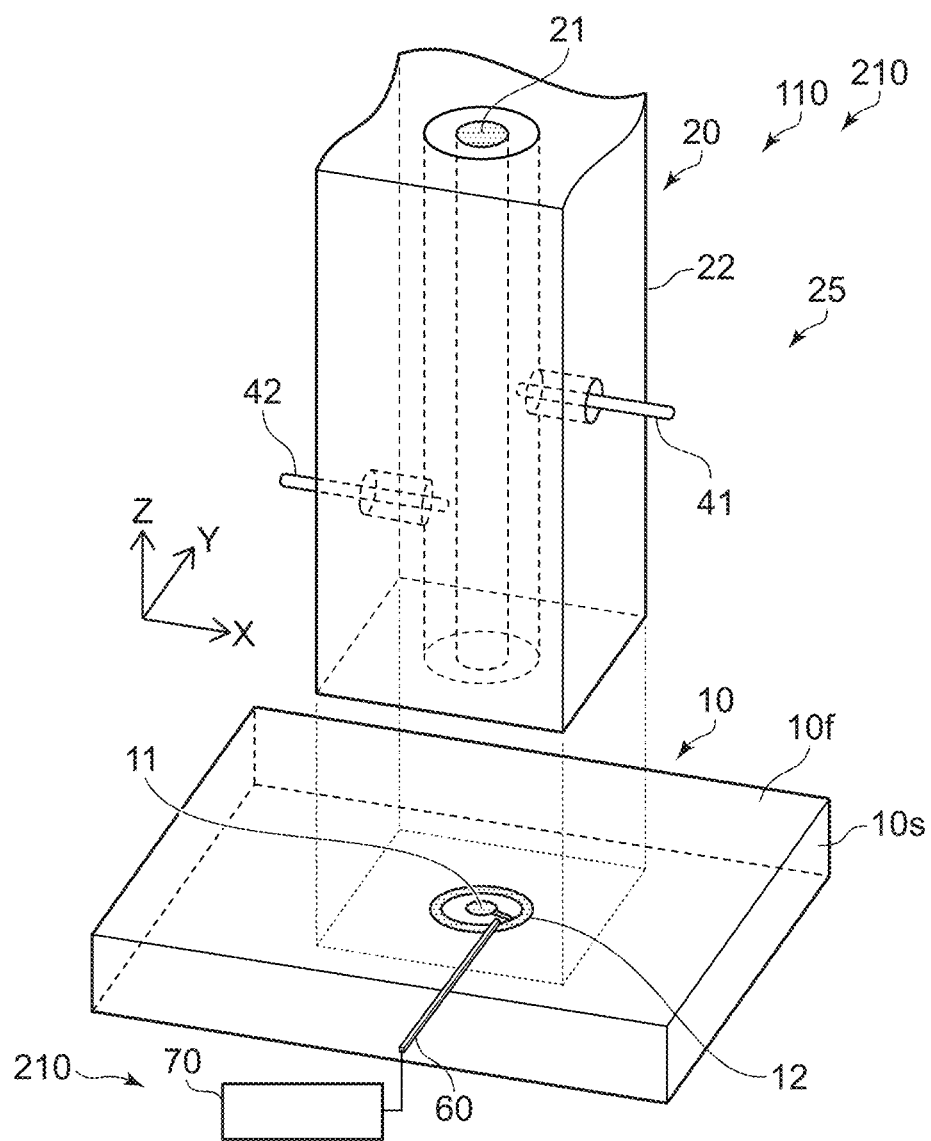
FIG. 14 is a schematic perspective view illustrating an evaluation state of the electronic circuit.

FIG. 14 is a schematic perspective view illustrating an evaluation state of the electronic circuit.

FIG. 14 shows an example of the state of deriving the parameter θ and the parameter α. In the example, multiple holes are provided in the second conductive part 22. A first probe 41 faces the first conductive part 21 via one hole. A second probe 42 faces the first conductive part 21 via another hole. For example, vibrational excitation is performed by supplying an AC signal (e.g., a microwave) to the first probe 41. The first state ST1 and the second state ST2 described above can be formed by modifying the conditions of the AC signal. At this time, a DC magnetic field may be applied via the first conductive member 60 to the space SP (e.g., the SQUID loop) surrounded with the first and second current paths 16a and 16b. The DC magnetic field is, for example, a magnetic field that satisfies $\cos(\pi \cdot \Phi/\Phi_0) < 0.95$. $\Phi$ is the magnetic flux inside the SQUID loop. "$\Phi_0$" is the flux quantum. "$\pi$" is pi. A coaxial line may be used as the first and second probes 41 and 42. The coaxial line includes, for example, a central conductor and an outer conductor that is around the central conductor. These probes are, for example, central conductors.

For example, the standing wave that is generated in the second resonator 20 can be detected using the second probe 42. According to the embodiment, various modifications of the method of deriving (measuring) the parameter θ and the parameter α are possible.

Figure 15:
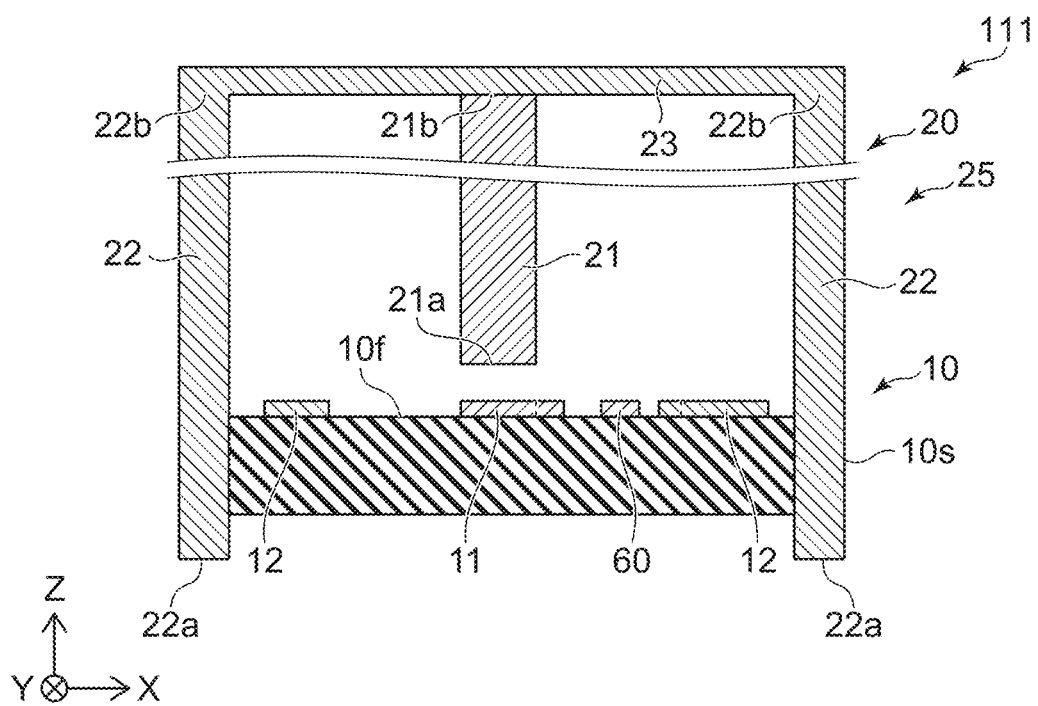
FIG. 15 is a schematic cross-sectional view illustrating an electronic circuit according to the first embodiment.
Figure 16:
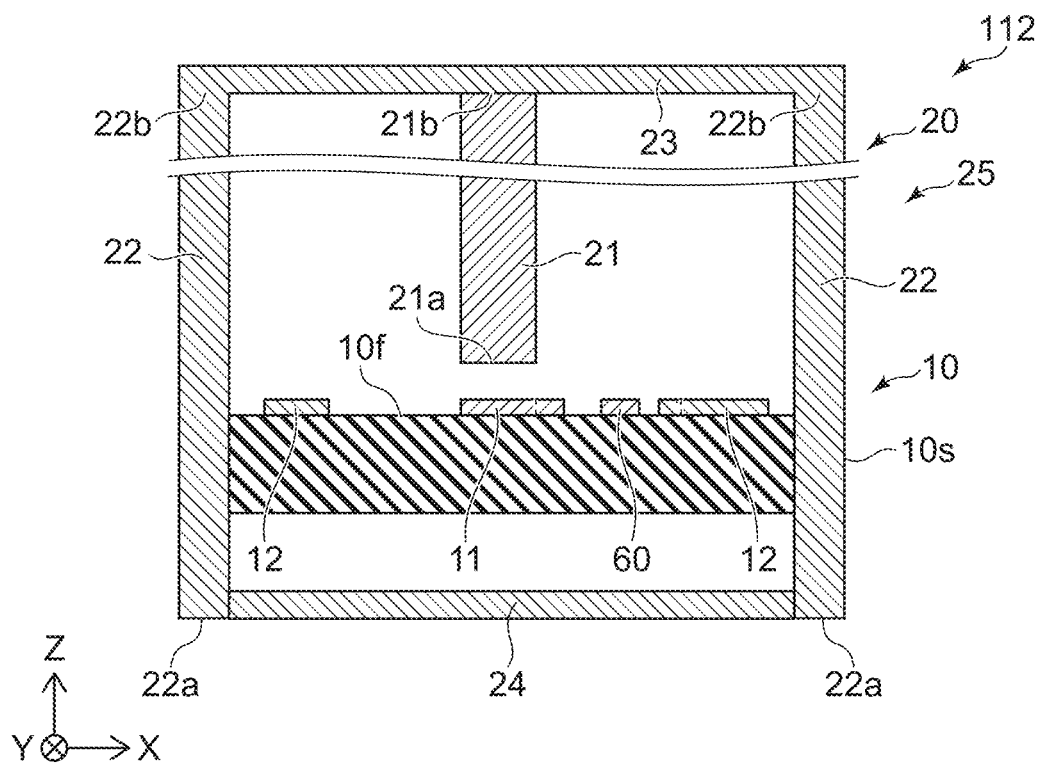
FIG. 16 is a schematic cross-sectional view illustrating an electronic circuit according to the first embodiment.
Figure 17:
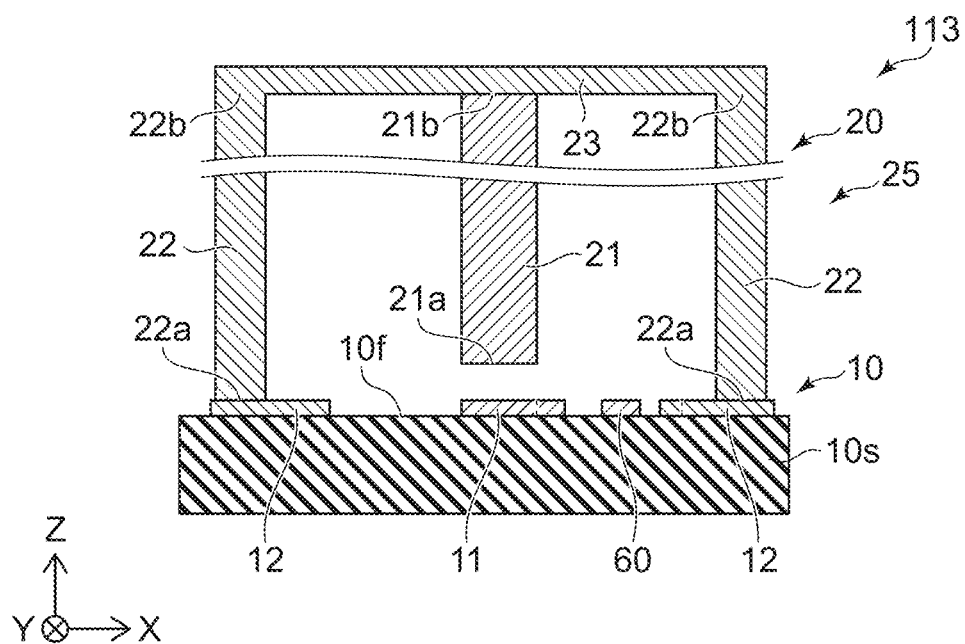
FIG. 17 is a schematic cross-sectional view illustrating an electronic circuit according to the first embodiment.

FIGS. 15 to 17 are schematic cross-sectional views illustrating electronic circuits according to the first embodiment.

These drawings are cross-sectional views that correspond to the line A1-A2 cross-sectional view of FIG. 1.

In an electronic circuit 111 according to the embodiment as shown in FIG. 15, the first resonator 10 is located between multiple regions of the second conductive part 22. For example, the base body 10s is located between the multiple regions of the second conductive part 22.

As shown in FIG. 16, an electronic circuit 112 according to the embodiment includes a conductive member 24. The base body 10s, the first resonator 10, and the first conductive part 21 are located between the conductive member 24 and the conductive member 23. For example, the conductive member 24 is connected with the second conductive part end 22a.

In an electronic circuit 113 according to the embodiment as shown in FIG. 17, the second conductive part 22 (e.g., the second conductive part end 22a) is electrically connected with the second conductive layer 12.

Otherwise, the configurations of the electronic circuits 111 to 113 may be similar to that of the electronic circuit 110. In the electronic circuits 111 to 113 as well, an electronic circuit and an oscillator can be provided in which downsizing is possible.

Figure 18:
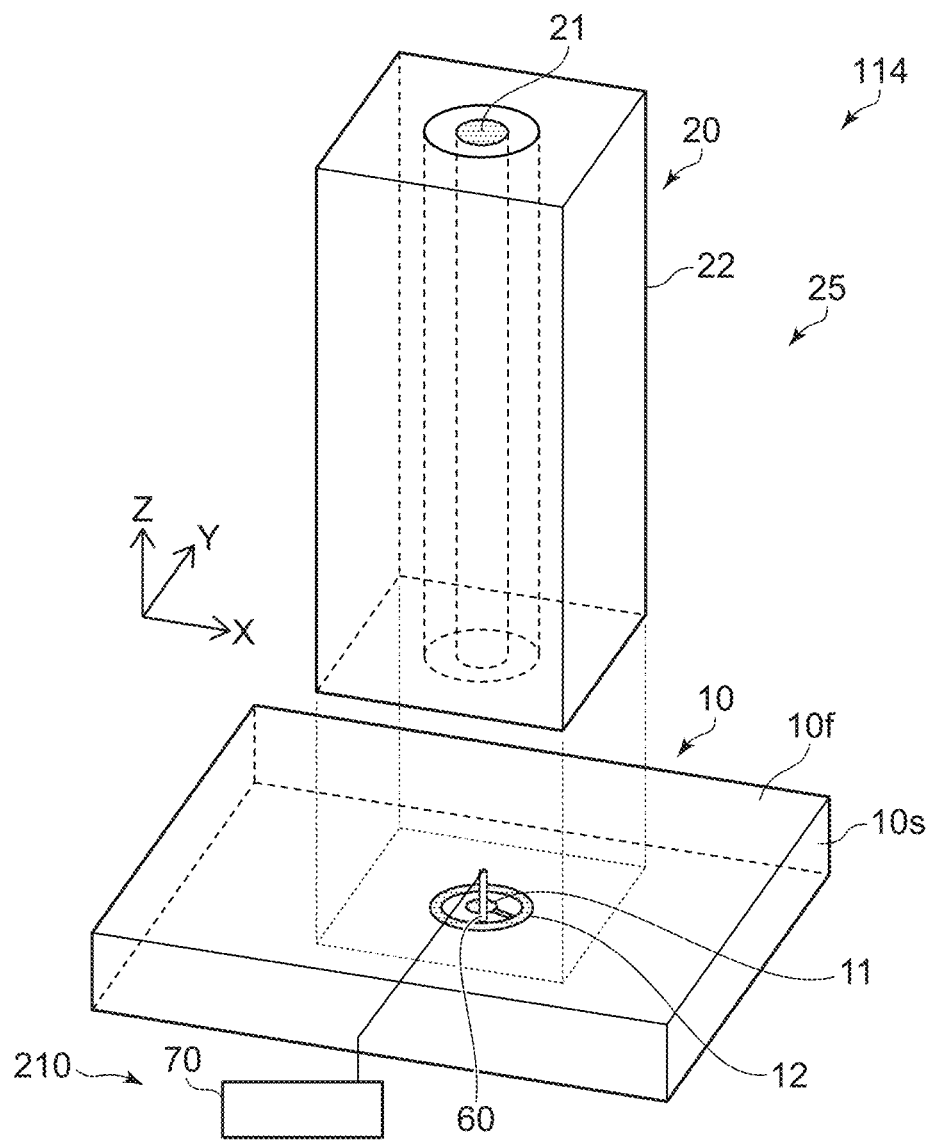
FIG. 18 is a schematic perspective view illustrating an electronic circuit according to the first embodiment.

FIG. 18 is a schematic perspective view illustrating an electronic circuit according to the first embodiment.

As shown in FIG. 18, an electronic circuit 114 according to the embodiment includes the first conductive member 60. The shape of the first conductive member 60 of the electronic circuit 114 is different from that of the electronic circuit 110. Otherwise, the configuration of the electronic circuit 114 may be similar to the configuration of the electronic circuit 110.

In the electronic circuit 114, the first conductive member 60 includes a portion that extends along the Z-axis direction (the first direction). In the example as well, the position in the first direction (the Z-axis direction) of at least a portion of the first conductive member 60 is between the position in the first direction (the Z-axis direction) of the first resonator 10 and the position in the first direction (the Z-axis direction) of the second resonator 20. The size of the electronic circuit 114 also can be reduced. An electronic circuit and an oscillator can be provided in which downsizing is possible.

Second Embodiment

Figure 19:
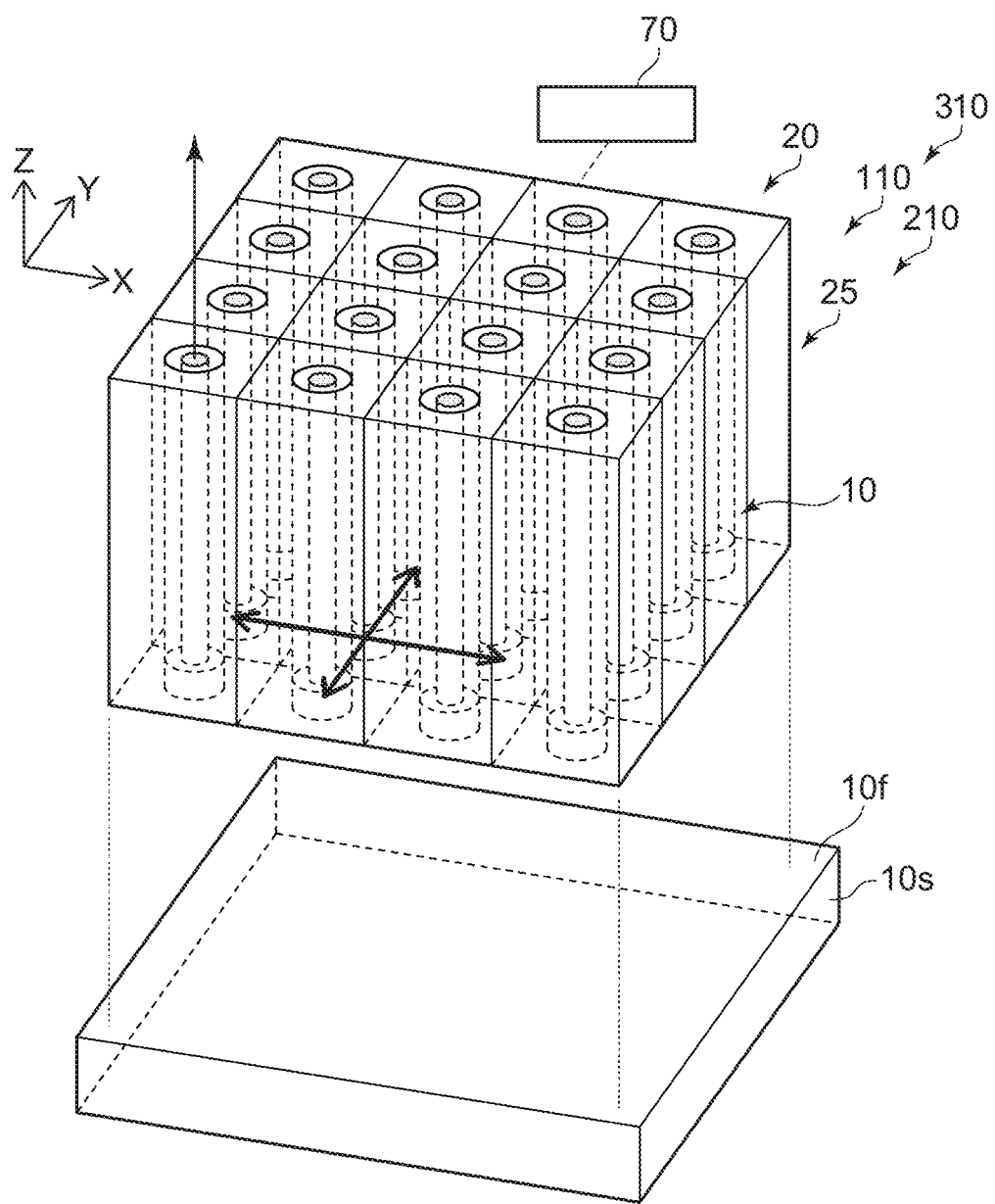
FIG. 19 is a schematic perspective view illustrating a calculating device according to a second embodiment.

FIG. 19 is a schematic perspective view illustrating a calculating device according to a second embodiment.

Figure 20:
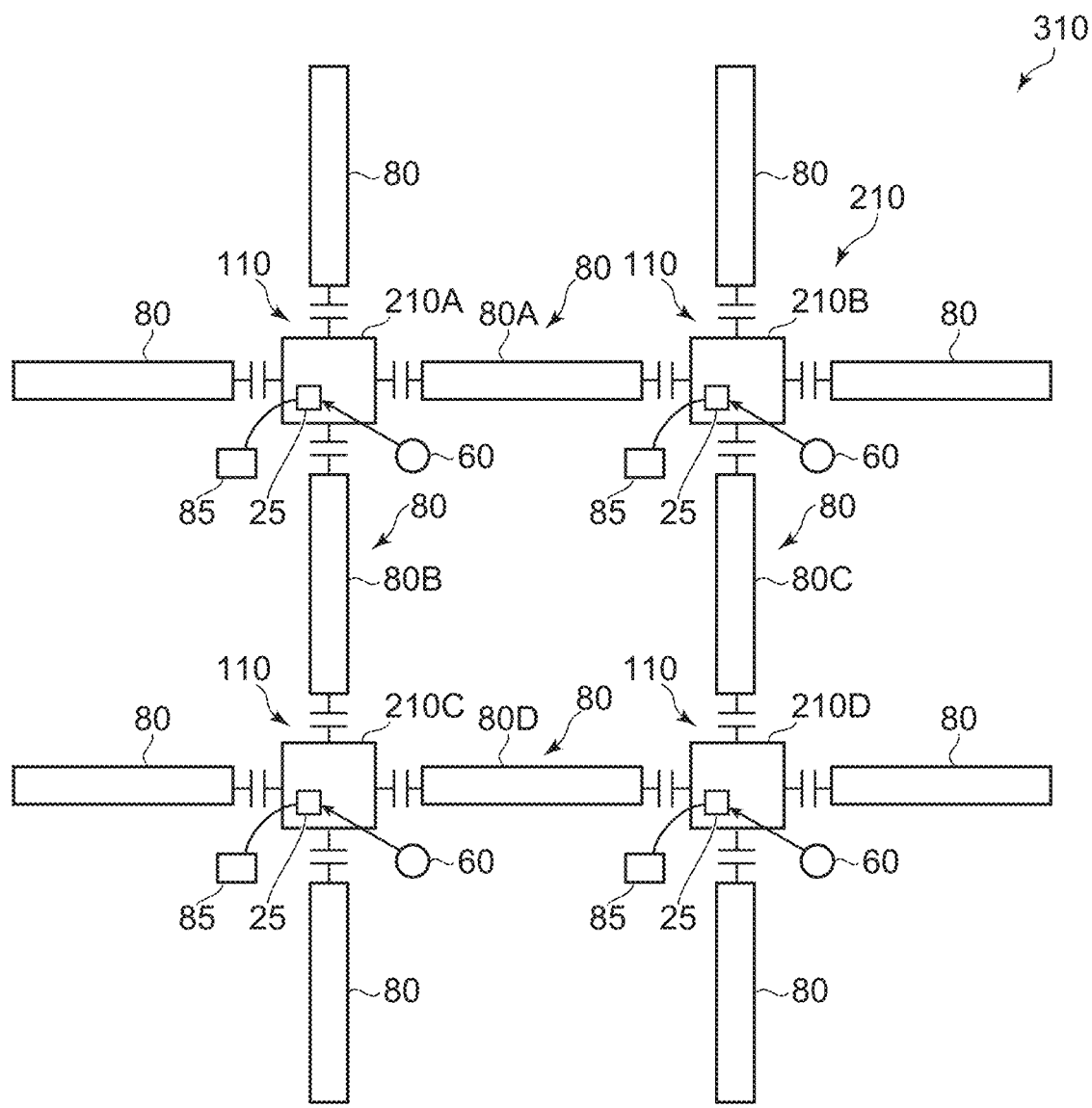
FIG. 20 is a schematic view illustrating the calculating device according to the second embodiment.

FIG. 20 is a schematic view illustrating the calculating device according to the second embodiment.

As shown in FIG. 19, the calculating device 310 according to the embodiment includes the oscillator 210 described in the first embodiment. The oscillator 210 includes multiple electronic circuits (e.g., the electronic circuits 110 to 114, etc.).

For example, as shown in FIG. 20, the calculating device 310 may include a coupler 80. The coupler 80 couples one of the multiple electronic circuits (e.g., the electronic circuits 110) and another one of the multiple electronic circuits (e.g., the electronic circuits 110). The coupler 80 is a tunable coupler. The coupler 80 couples one of the multiple oscillators 210 and another one of the multiple oscillators 210. The coupler 80 is a tunable coupler.

For example, the multiple oscillators 210 include first to fourth oscillators 210A to 210D. Multiple couplers 80 are included in the example. For example, the multiple couplers 80 include first to fourth couplers 80A to 80D.

The first coupler 80A couples the first oscillator 210A and the second oscillator 210B. The second coupler 80B couples the first oscillator 210A and the third oscillator 210C. The third coupler 80C couples the second oscillator 210B and the fourth oscillator 210D. The fourth coupler 80D couples the third oscillator 210C and the fourth oscillator 210D.

For example, each of the multiple oscillators 210 may include the first conductive member 60. Each of the multiple oscillators 210 may further include the controller 70. The multiple oscillators 210 may further include one controller 70. For example, each of the multiple oscillators 210 is connected to a reader 85. The reader 85 may be included in the controller 70.

The coupler 80 can regulate the strength of the coupling of the multiple oscillators 210. The coupler 80 includes, for example, a microwave waveguide resonator that includes a dc SQUID.

For example, when solving a combinatorial optimization problem (an Ising problem), the coupling strength and the external field intensity of the calculating device 310 are set according to the given problem. For example, the multiple oscillators 210 are caused to oscillate by increasing the pump power of the multiple oscillators 210 from zero. The problem can be solved thereby.

According to the embodiment, for example, a quantum gate operation can be performed by controlling the coupling strength, the external field intensity, and the pump strength. In the quantum gate operation, the two stable oscillation states of each of the multiple oscillators 210 are used as the 0 state or the 1 state of the qubit.

Embodiments may include the following configurations (e.g., technological proposals).

Configuration 1

An electronic circuit, comprising:
an element part including
a first resonator including
a first conductive layer,
a second conductive layer,
a first current path including a first Josephson junction, the first current path including a first end portion and a second end portion, the first end portion being connected with the first conductive layer, the second end portion being connected with the second conductive layer, and
a second current path including a second Josephson junction, the second current path including a third end portion and a fourth end portion, the third end portion being connected with the first conductive layer, the fourth end portion being connected with the second conductive layer, and
a second resonator configured to be electromagnetically coupled with the first resonator.

Configuration 2

The electronic circuit according to Configuration 1, wherein
the first resonator is a nonlinear resonator, and
the second resonator is a linear resonator.

Configuration 3

The electronic circuit according to Configuration 1 or 2, wherein
a direction from the first resonator toward the second resonator is along a first direction, and
the first direction crosses a first plane including the first and second current paths.

Configuration 4

The electronic circuit according to Configuration 1 or 2, wherein
the element part includes a base body,
the base body includes a first surface,
the first conductive layer, the first current path, and the second current path are located at the first surface, and
a direction from the first resonator toward the second resonator is along a first direction crossing the first surface.

Configuration 5

The electronic circuit according to Configuration 4, wherein
the second resonator includes a first conductive part and a second conductive part,
a length of the first conductive part in the first direction is greater than a length of the first conductive part in a direction crossing the first direction, and
the second conductive part is located around the first conductive part in a first plane along the first surface.

Configuration 6

The electronic circuit according to Configuration 3 or 4, wherein
the second resonator is a coaxial resonator,
the coaxial resonator includes a superconductor, and
an axis of the coaxial resonator is along the first direction.

Configuration 7
The electronic circuit according to Configuration 4, wherein
the second conductive layer is located around the first conductive layer along a first plane, and
the first plane is along the first surface.

Configuration 8
The electronic circuit according to any one of Configurations 5 to 7, further comprising:
a first conductive member,
at least a portion of the first conductive member being along the first plane,
a position in the first direction of the at least a portion being between a position in the first direction of the first resonator and a position in the first direction of the second resonator.

Configuration 9
The electronic circuit according to any one of Configurations 1 to 8, wherein
a qubit is formed of the first and second resonators.

Configuration 10
An oscillator, comprising:
the electronic circuit according to any one of Configurations 1 to 7; and
a controller,
the electronic circuit further including a first conductive member,
the controller being configured to supply an electrical signal to the first conductive member,
the first current path and the second current path being around a space,
a magnetic field being generated from the first conductive member according to the electrical signal supplied to the first conductive member,
the magnetic field passing through the space.

Configuration 11
The oscillator according to Configuration 10, wherein
at least a portion of the first conductive member is along a plane including the first and second current paths, and
a position in the first direction of the at least a portion is between a position in the first direction of the first resonator and a position in the first direction of the second resonator.

Configuration 12
The oscillator according to Configuration 11, wherein
the controller is configured to modify a frequency of an alternating current component of the electrical signal,
the element part oscillates when the controller supplies the electrical signal to the first conductive member, and
an oscillation frequency of the element part is ½ of the frequency of the alternating current component.

Configuration 13
The oscillator according to Configuration 12, wherein
a difference between the oscillation frequency and one of a plurality of natural frequencies of the element part is not more than 10 times a frequency corresponding to a Kerr coefficient of the first resonator.

Configuration 14
The oscillator according to Configuration 12, wherein
a plurality of natural frequencies of the element part includes a first natural frequency and a second natural frequency,
the second natural frequency is nearest the first natural frequency among the plurality of natural frequencies, and
a difference between the oscillation frequency and the first natural frequency is not more than ½ of a difference between the first natural frequency and the second natural frequency.

Configuration 15
The oscillator according to Configuration 14, wherein
the first natural frequency is lowest among the plurality of natural frequencies of the element part.

Configuration 16
The oscillator according to Configuration 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
a ratio of the second natural frequency to the first natural frequency is $\sin(\alpha)$,
the $\alpha$ (degrees) is not less than 0 degrees and not more than 90 degrees, and
the $\alpha$ is greater than $-2/3$ times the $\theta$.

Configuration 17
The oscillator according to Configuration 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
a ratio of the second natural frequency to the first natural frequency is $\sin(\alpha)$,
the $\alpha$ (degrees) is not less than 0 degrees and not more than 90 degrees, and
the $\alpha$ is less than $-9/5$ times the $\theta$.

Configuration 18
The oscillator according to Configuration 15, wherein
a first state and a second state can be formed,
an alternating current electromagnetic field based on a first alternating current signal including the first natural frequency is applied to the element part in the first state, an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is tan(θ),
the θ (degrees) is not less than −90 degrees and not more than 0 degrees,
a ratio of the second natural frequency to the first natural frequency is sin(α),
the α (degrees) is not less than 0 degrees and not more than 90 degrees, and
the θ is less than −35 degrees, or the α is greater than a sum of the θ and 90 degrees.

Configuration 19

The oscillator according to Configuration 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is tan(θ),
the θ (degrees) is not less than −90 degrees and not more than 0 degrees,
a ratio of the second natural frequency to the first natural frequency is sin(α),
the α (degrees) is not less than 0 degrees and not more than 90 degrees, and
the θ is greater than −45 degrees, or the α is greater than a sum of 108 degrees and 90/75 times the θ.

Configuration 20

A calculating device, comprising:
the oscillator according to any one of Configurations 11 to 19; and
a coupler,
the oscillator including a plurality of the electronic circuits,
the coupler coupling one of the plurality of electronic circuits and an other one of the plurality of electronic circuits.

According to the embodiment, an electronic circuit, an oscillator, and a calculating device can be provided in which downsizing is possible.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in electronic circuits, oscillators, and calculating devices such as conductive layers, current paths, conductive parts, conductive members, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all electronic circuits, oscillators, and calculating devices practicable by an appropriate design modification by one skilled in the art based on the electronic circuits, the oscillators, and the calculating devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An electronic circuit, comprising:
an element part including
a first resonator including
a first conductive layer,
a second conductive layer,
a first current path including a first Josephson junction, the first current path including a first end portion and a second end portion, the first end portion being connected with the first conductive layer, the second end portion being connected with the second conductive layer, and
a second current path including a second Josephson junction, the second current path including a third end portion and a fourth end portion, the third end portion being connected with the first conductive layer, the fourth end portion being connected with the second conductive layer, and
a second resonator configured to be electromagnetically coupled with the first resonator,
wherein
the element part includes a base body,
the base body includes a first surface,
the first conductive layer, the first current path, and the second current path are located at the first surface,
a direction from the first resonator toward the second resonator is along a first direction crossing the first surface, and
at least a part of the second resonator is apart from the first surface.

2. The circuit according to claim 1, wherein
the first resonator is a nonlinear resonator, and
the second resonator is a linear resonator.

3. The circuit according to claim 1, wherein
a direction from the first resonator toward the second resonator is along a first direction, and
the first direction crosses a first plane including the first path and the second current path.

4. The circuit according to claim 3, wherein
the second resonator is a coaxial resonator,
the coaxial resonator includes a superconductor, and
an axis of the coaxial resonator is along the first direction.

5. The circuit according to claim 1, wherein
the second resonator includes a first conductive part and a second conductive part,
a length of the first conductive part in the first direction is greater than a length of the first conductive part in a direction crossing the first direction, and
the second conductive part is located around the first conductive part in a first plane along the first surface.

6. The circuit according to claim 5, further comprising:
a first conductive member,
at least a portion of the first conductive member being along the first plane,
a position in the first direction of the at least a portion being between a position in the first direction of the first resonator and a position in the first direction of the second resonator.

7. The circuit according to claim 1, wherein
the second conductive layer is located around the first conductive layer along a first plane, and
the first plane is along the first surface.

8. The circuit according to claim 1, wherein
a qubit is formed of the first resonator and the second resonator.

9. An oscillator, comprising:
the electronic circuit according to claim 1; and
a controller, wherein
the electronic circuit further includes a first conductive member,
the controller is configured to supply an electrical signal to the first conductive member,
the first current path and the second current path are around a space,
a magnetic field is generated from the first conductive member according to the electrical signal supplied to the first conductive member,
the magnetic field passes through the space.

10. The oscillator according to claim 9, wherein
at least a portion of the first conductive member is along a plane including the first and second current paths, and
a position in the first direction of the at least a portion is between a position in the first direction of the first resonator and a position in the first direction of the second resonator.

11. A calculating device, comprising:
the oscillator according to claim 10; and
a coupler,
the oscillator including a plurality of the electronic circuits,
the coupler coupling one of the electronic circuits and an other one of the electronic circuits.

12. The oscillator according to claim 10, wherein
the controller is configured to modify a frequency of an alternating current component of the electrical signal,
the element part oscillates when the controller supplies the electrical signal to the first conductive member, and
an oscillation frequency of the element part is ½ of the frequency of the alternating current component.

13. The oscillator according to claim 12, wherein
a difference between the oscillation frequency and one of a plurality of natural frequencies of the element part is not more than 10 times a frequency corresponding to a Kerr coefficient of the first resonator.

14. The oscillator according to claim 12, wherein
a plurality of natural frequencies of the element part includes a first natural frequency and a second natural frequency,
the second natural frequency is nearest the first natural frequency among the natural frequencies, and
a difference between the oscillation frequency and the first natural frequency is not more than ½ of a difference between the first natural frequency and the second natural frequency.

15. The oscillator according to claim 14, wherein
the first natural frequency is lowest among the natural frequencies of the element part.

16. The oscillator according to claim 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
the a ratio of the second natural frequency to the first natural frequency is $\sin(\alpha)$,
the $\alpha$ (degrees) is not less than 0 degrees and not more than 90 degrees, and
the $\alpha$ is greater than −⅔ times the $\theta$.

17. The oscillator according to claim 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
a ratio of the second natural frequency to the first natural frequency is $\sin(\alpha)$,
the $\alpha$ (degrees) is not less than 0 degrees and not more than 90 degrees, and
the $\alpha$ is less than −9/5 times the $\theta$.

18. The oscillator according to claim 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
a ratio of the second natural frequency to the first natural frequency is $\sin(\alpha)$,
the $\alpha$ (degrees) is not less than 0 degrees and not more than 90 degrees, and
the $\theta$ is less than −35 degrees, or the $\alpha$ is greater than a sum of the 0 and 90 degrees.

19. The oscillator according to claim 15, wherein
a first state and a second state can be formed,
an alternating current electromagnetic field based on a first alternating current signal including the first natural frequency is applied to the element part in the first state,
an alternating current electromagnetic field based on a second alternating current signal including the second natural frequency is applied to the element part in the second state,
an intensity of the first alternating current signal is substantially equal to an intensity of the second alternating current signal,
a ratio of a second electric field amplitude of a standing wave generated in the second resonator in the second state to a first electric field amplitude of a standing wave generated in the second resonator in the first state is $\tan(\theta)$,
the $\theta$ (degrees) is not less than −90 degrees and not more than 0 degrees,
a ratio of the second natural frequency to the first natural frequency is $\sin(\alpha)$,
the $\alpha$ (degrees) is not less than 0 degrees and not more than 90 degrees, and
the $\theta$ is greater than −45 degrees, or the $\alpha$ is greater than a sum of 108 degrees and 90/75 times the $\theta$.

* * * * *